United States Patent
Zhang et al.

(10) Patent No.: US 12,391,576 B2
(45) Date of Patent: Aug. 19, 2025

(54) LITHIUM BATTERY POSITIVE ELECTRODE MATERIAL PRECURSOR, PREPARATION METHOD THEREFOR AND APPLICATION THEREOF

(71) Applicants: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

(72) Inventors: Tongbao Zhang, Shanghai (CN); Biwei Wang, Shanghai (CN); Ye Zhu, Shanghai (CN); Huanxin Gao, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

( * ) Notice: Subject to any disclaimer, the term of this patent is extended or adjusted under 35 U.S.C. 154(b) by 709 days.

(21) Appl. No.: 17/754,967

(22) PCT Filed: Oct. 16, 2020

(86) PCT No.: PCT/CN2020/121341
§ 371 (c)(1),
(2) Date: Apr. 18, 2022

(87) PCT Pub. No.: WO2021/073583
PCT Pub. Date: Apr. 22, 2021

(65) Prior Publication Data
US 2022/0388863 A1    Dec. 8, 2022

(30) Foreign Application Priority Data

Oct. 17, 2019   (CN) .................... 201910989951.9
Oct. 17, 2019   (CN) .................... 201910990467.8

(51) Int. Cl.
*C01G 53/50*   (2025.01)
*H01M 10/0525*   (2010.01)

(52) U.S. Cl.
CPC ........ *C01G 53/50* (2013.01); *H01M 10/0525* (2013.01); *C01P 2002/74* (2013.01); *C01P 2006/40* (2013.01)

(58) Field of Classification Search
CPC .................... H01M 10/0525; C01G 53/50
See application file for complete search history.

(56) References Cited

U.S. PATENT DOCUMENTS

| 7,785,742 B2 | 8/2010 | Suhara et al. |
| 2019/0260024 A1 | 8/2019 | Nakamura et al. |

FOREIGN PATENT DOCUMENTS

| CN | 105271444 A | * | 1/2016 | ............. C01G 53/00 |
| CN | 106745336 A | | 5/2017 | |

(Continued)

OTHER PUBLICATIONS

Meng, Junxia et al.; "precursor Pre-326-338oxidation enables highly exposed plane (010) for high-rate Li-rich layered oxide cathode materials"; Electrochimica Acta, vol. 309, Apr. 17, 2019; ISSN.: 0013-4686, pp. 326-338.

*Primary Examiner* — Karie O'Neill Apicella
(74) *Attorney, Agent, or Firm* — NKL Law; Allen Xue

(57) ABSTRACT

A lithium battery positive active material precursor, a preparation method therefor and the use thereof are provided. The precursor has a chemical formula of $Ni_xCo_yM_z(OH)_2$, wherein M is at least one metal selected from the group consisting of Fe, Cr, Cu, Ti, Mg, W, Mo, Nb, Zn, Sn, Zr, Ga, (Continued)

Mn and Al, 0.3≤x≤1, 0<y≤0.5, 0<z≤0.3; and the precursor comprises aggregates of platy monocrystals and polyhedral monocrystal particles. In the XRD pattern of the precursor, (001), I(100) and I(101) satisfy the following relationship: I(001)/I(100) is not less than about 1.5, and I(001)/I(101) is not less than about 1.2.

20 Claims, 8 Drawing Sheets

(56) References Cited

FOREIGN PATENT DOCUMENTS

| | | | |
|---|---|---|---|
| CN | 107915263 | A | 4/2018 |
| CN | 109560276 | A | 4/2019 |
| EP | 2763219 | A2 | 8/2014 |
| KR | 20150059820 | A | 6/2015 |

* cited by examiner

LITHIUM BATTERY POSITIVE ELECTRODE MATERIAL PRECURSOR, PREPARATION METHOD THEREFOR AND APPLICATION THEREOF

CROSS REFERENCE TO RELATED APPLICATIONS

This application is a U.S. national entry of PCT International Application No. PCT/CN2020/121341, filed on Oct. 16, 2020, which claims priority from Chinese patent application No. 201910990467.8, titled "positive active material precursor, preparation method therefor, positive active material and application thereof", filed on Oct. 17, 2019, and priority from Chinese patent application No. 201910989951.9, titled "positive active material precursor, preparation method therefor, lithium battery positive electrode and application thereof", filed on Oct. 17, 2019, the contents of which are incorporated herein by reference in their entirety.

TECHNICAL FIELD

The present application relates to the field of lithium batteries, particularly to a lithium battery positive active material precursor, its preparation and application thereof.

BACKGROUND ART

Lithium-ion batteries (also referred to as "lithium batteries" in the present application) have the advantages of high energy density, high output voltage, low self-discharge, excellent cycle performance, no memory effect, etc., and are widely used in the fields of portable electronic products, electric tools, electric vehicles, etc. Particularly, in recent years, the new energy automobile popularization policies of various national governments are continuously upgraded, which promotes the explosive development of power lithium batteries.

Positive active material is a key component of a lithium battery, which not only determines key indexes such as energy density of the lithium battery, but also accounts for about 40% of the cost of the whole battery. With the requirement on the endurance mileage of electric vehicles growing higher, ternary positive active materials with higher energy density gradually become mainstream positive active materials for passenger vehicles.

The morphology of a lithium battery positive active material has an important influence on its electrochemical property. At present, there are two main morphologies of commercial ternary positive active materials. One is micron-scale spherical secondary polycrystal aggregate particle formed by the aggregation of nano- or submicron-scale primary particles, and tiny polycrystal particles of positive active materials having such a morphology can be fully contacted with electrolyte to provide a good rate capability, but side reactions between tiny polycrystal particles and the electrolyte may occur easily, causing transition metal to dissolve in the electrolyte, and thus showing a poor battery cycling stability. The other is dispersed monocrystal particle, and positive active materials with such a morphology have a stable crystal structure, are good in compatibility with electrolyte in the charging and discharging process, are not easy to break in the cycling process, and show good battery cycling stability, but dispersed monocrystal particles are large in size and poor in capacity and rate capability.

For a ternary positive active material, its morphology is substantially determined by the precursor thereof. At present, the morphology of commercial ternary positive active material precursor is primarily micron-scale spherical secondary polycrystal aggregate particle formed by the aggregation of nano- or submicron-scale primary particles. For example, Chinese patent application publication No. CN 107915263A discloses a precursor material having a micron-scale spherical secondary polycrystal aggregate morphology with a particle size of 3.5-4.0 μm. In the charging and discharging processes, tiny primary particles of such a material can be contacted and reacted with electrolyte, so that the capacity and first-cycle efficiency of the polycrystal material is relatively low, which does not meet the requirements for practical application in power batteries.

SUMMARY OF THE INVENTION

In order to overcome the problems suffered in the prior art, an object of the present application is to provide a novel precursor of a lithium battery positive active material, its preparation and application thereof, the lithium battery positive active material prepared from which shows an improved electrochemical property.

In order to achieve the above object, in an aspect, the present application provides a lithium battery positive active material precursor having a chemical formula of $Ni_xCo_yM_z(OH)_2$, wherein M is at least one metal selected from the group consisting of Fe, Cr, Cu, Ti, Mg, W, Mo, Nb, Zn, Sn, Zr, Ga, Mn, and Al, $0.3 \leq x \leq 1$, $0 < y \leq 0.5$, $0 < z \leq 0.3$, and the values of x, y, and z meet the electroneutrality rule;

wherein the precursor comprises aggregates of platy monocrystals and polyhedral monocrystal particles, and I(001), I(100) and I(101) of the XRD pattern of the precursor satisfy the following relationships:

I(001)/I(100) is not less than about 1.5, and
I(001)/I(101) is not less than about 1.2,
preferably, I(101)/I(100) is not less than about 1.3,
wherein I(001), I(100) and I(101) represent intensities, in terms of peak height, of the diffraction peaks corresponding to the (001), (100) and (101) crystal faces, respectively.

In another aspect, the present application provides a method for preparing a lithium battery positive active material precursor, comprising the steps of:

(1) mixing a metal salt solution with a precipitant solution and a complexing agent solution for reaction, wherein the precipitant solution and the complexing agent solution are continuously fed into the reaction system, while the metal salt solution is intermittently fed into the reaction system;

(2) carrying out solid-liquid separation and drying treatment on the product obtained in step (1) to obtain the precursor;

wherein the metal in the metal salt solution comprises Ni, Co and M, the metal M is at least one selected from the group consisting of Fe, Cr, Cu, Ti, Mg, W, Mo, Nb, Zn, Sn, Zr, Ga, Mn and Al, and the molar ratio among the metals Ni, Co and M is about (0.3-1):(0-0.5):(0-0.3), and wherein the amounts by mole of Co and M used are not zero.

In another aspect, the present application provides a lithium battery positive active material precursor obtained by the method for preparing the lithium battery positive active material precursor according to the present application.

In another aspect, the present application provides a lithium battery positive active material having a chemical formula of $Li_aNi_xCo_yM_zO_2$, wherein M is at least one metal selected from the group consisting of Fe, Cr, Cu, Ti, Mg, W, Mo, Nb, Zn, Sn, Zr, Ga, Mn and Al, $0.9 \leq a \leq 1.2$, $0.3 \leq x \leq 1$, $0 < y \leq 0.5$, $0 < z \leq 0.3$, and the values of a, x, y and z meet the electroneutrality rule;

wherein the positive active material comprises particles in the form of secondary fusion body of monocrystals formed by primary monocrystal particles that are at least partially fused.

In another aspect, the present application provides a method for preparing a lithium battery positive active material, comprising the steps of:

(I) providing a lithium battery positive active material precursor;

(II) mixing the precursor with a lithium source to carry out solid-phase reaction to obtain the positive active material;

wherein the precursor is a lithium battery positive active material precursor according to the present application.

In another aspect, the present application provides a lithium battery positive active material obtained by the method for preparing the lithium battery positive active material according to the present application.

In still another aspect, the present application provides a lithium battery positive electrode comprising a positive active material, a binder, and a conductive agent, wherein the positive active material is the lithium battery positive active material according to the present application.

In yet another aspect, the present application provides a lithium battery comprising a positive electrode, a negative electrode, an electrolyte, and a separator, wherein the positive electrode is a lithium battery positive electrode according to the present application.

The lithium battery positive active material precursor according to the present application, being different from ternary positive active material precursors with a spherical polycrystal aggregate morphology, comprises aggregates of platy monocrystals and polyhedral monocrystal particles, and has more exposed areas of the (001) crystal face and the (101) crystal face, so that the positive active material precursor shows an improved electrochemical property.

The lithium battery positive active material according to the present application, being different from existing positive active materials in the forms of spherical polycrystal aggregates and dispersed monocrystal particles, comprises particles in the form of secondary fusion body of monocrystals formed by primary monocrystal particles that are at least partially fused. The positive active material has both the advantages of ternary positive active materials having a spherical polycrystal aggregate morphology and the advantages of ternary positive active materials having a dispersed monocrystal morphology, and exhibits the characteristics of high discharge capacity, high first-cycle efficiency, good rate capability and good cycling stability. Lithium batteries prepared using the positive active material may exhibit a discharge capacity of 206.9 mAh/g, and a first-cycle efficiency of 92.1%, at a rate of 0.1 C; a capacity retention of 96.1% after 80 cycles at a rate of 1 C; and a discharge capacity of 120 mAh/g at a rate of 10 C.

DESCRIPTION OF THE REFERENCE NUMERALS

Figure 1A:
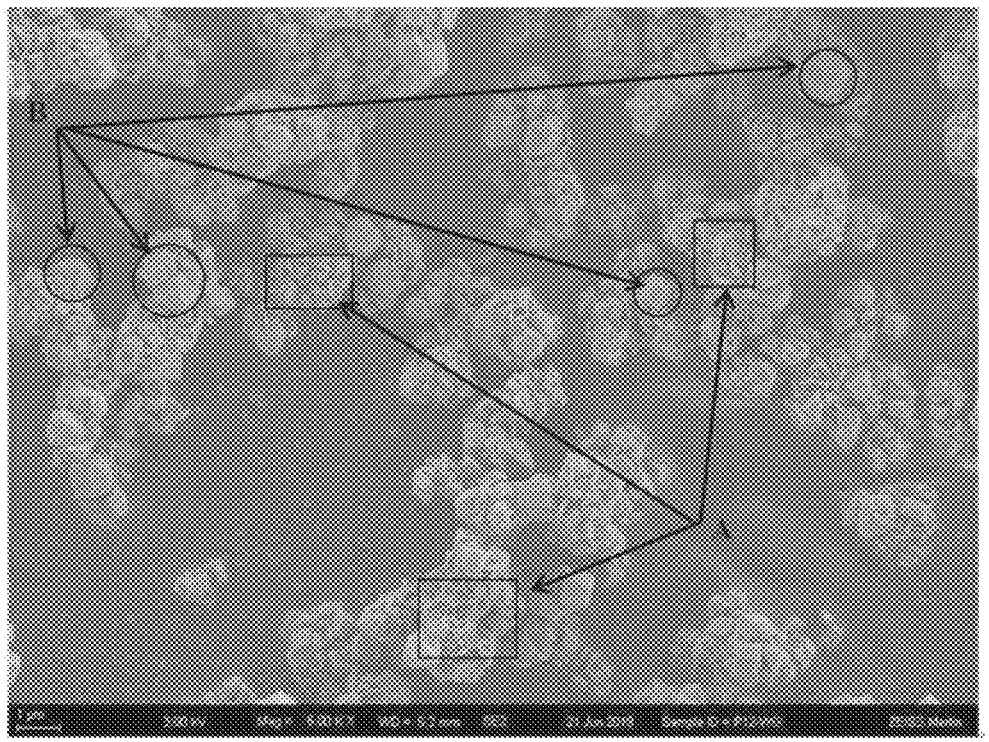
FIG. 1A is an SEM image of the positive active material precursor obtained in Example 1 of the present application.

A aggregates of platy monocrystals
B polyhedral monocrystal particles

DETAILED DESCRIPTION OF THE INVENTION

The present application will be further described hereinafter in detail with reference to particular embodiments thereof and the accompanying drawings. It should be noted that the particular embodiments of the present application are provided for illustration purpose only, and are not intended to be limiting in any manner.

Any specific numerical value, including the endpoints of a numerical range, described in the context of the present application is not restricted to the exact value thereof, but should be interpreted to further encompass all values close to said exact value. Moreover, regarding any numerical range described herein, arbitrary combinations can be made between the endpoints of the range, between each endpoint and any specific value within a range, or between any two specific values within a range, to provide one or more new numerical range(s), where said new numerical range(s) should also be deemed to have been specifically described in the present application.

Unless otherwise stated, the terms used herein have the same meaning as commonly understood by the person skilled in the art; and if the terms are defined herein and their definitions are different from the ordinary understanding in the art, the definition provided herein shall prevail.

In the context of the present application, the expression "meet/meeting the electroneutrality rule" means that the algebraic sum of the valences of all elements present in the corresponding chemical formula is zero.

In the context of the present application, the term "aggregate(s)" refers to aggregate(s) formed by a plurality of particles agglomerated together by a physical interaction (e.g., electrostatic force, van der waals force, etc.), which may be easily disintegrated by external force as the interaction between the plurality of particles is weak.

In the context of the present application, the term "fusion body" refers to a monolithic structure formed by at least partially fusing and bonding a plurality of particles, which may not be easily disintegrated by external force as the plurality of particles have been fused together into a single body.

In the context of the present application, the expression "at least partially fused/fusing" means that at least a part of the body of a particle is fused with at least a part of the body of another particle, thereby forming a single body.

In the context of the present application, the expression "intermittently fed/feeding" means that the metal salt solution is fed discontinuously to the reaction system in a plurality of (e.g., 2, 3, 4, 5, 6, etc.) portions, preferably each portion is fed in a continuous manner, particularly at a constant rate, until a predetermined time is reached or a predetermined amount of material has been added.

In the context of the present application, in addition to those matters explicitly stated, any matter or matters not mentioned are considered to be the same as those known in the art without any change. Moreover, any of the embodiments described herein can be freely combined with another one or more embodiments described herein, and the technical solutions or ideas thus obtained are considered as part of the original disclosure or original description of the present application, and should not be considered to be a new matter that has not been disclosed or anticipated herein, unless it is clear to the person skilled in the art that such a combination is obviously unreasonable.

All publications, patent applications, patents, and other references cited herein are hereby incorporated by reference in their entirety.

In a first aspect, the present application provides a lithium battery positive active material precursor, comprising aggregates of platy monocrystals and polyhedral monocrystal particles, and I(001), I(100), and I(101) of the XRD pattern of the precursor satisfy the following relationships: I(001)/I(100) is not less than about 1.5, preferably not greater than about 10, and I(001)/I(101) is not less than about 1.2, preferably not greater than about 5, preferably, I(101)/I(100) is not less than about 1.3, preferably not greater than about 5;

and wherein the precursor has a chemical formula of $Ni_xCo_yM_z(OH)_2$, wherein M is at least one metal selected from the group consisting of Fe, Cr, Cu, Ti, Mg, W, Mo, Nb, Zn, Sn, Zr, Ga, Mn and Al, $0.3 \leq x \leq 1$, $0 < y \leq 0.5$, $0 < z \leq 0.3$, and the values of x, y and z meet the electroneutrality rule.

According to the present application, the precursor comprises aggregates of platy monocrystals and polyhedral monocrystal particles, preferably the precursor consists substantially of aggregates of platy monocrystals and polyhedral monocrystal particles.

In the context of the present application, the term "aggregate(s) of platy monocrystals" refers to particles with a primary morphology of platy monocrystal and a secondary morphology of aggregate formed by agglomeration of platy monocrystals; the term "polyhedral monocrystal particle(s)" refers to monocrystal particle(s) with a polyhedral morphology.

In the context of the present application, the I(001) refers to the intensity of the diffraction peak corresponding to the (001) crystal face; the I(100) refers to the intensity of the diffraction peak corresponding to the (100) crystal face; and the I(101) refers to the intensity of the diffraction peak corresponding to the (101) crystal face, wherein the intensity of the diffraction peak is measured as the height thereof.

In some preferred embodiments, the I(001), I(100) and I(101) of the XRD pattern of the precursor satisfy the following relationships: I(001)/I(100) is not less than about 1.5 and not greater than about 10, for example not greater than about 5 or not greater than about 3; I(001)/I(101) is not less than about 1.2 and not greater than about 5, such as not greater than about 3 or not greater than about 2, and I(101)/I(100) is not less than about 1.3 and not greater than about 5, such as not greater than about 3 or not greater than about 2.

In some preferred embodiments, the I(001), I(100) and I(101) of the XRD pattern of the precursor satisfy the following relationships: I(001)/I(100) is not less than about 1.8, I(001)/I(101) is not less than about 1.3, and I(101)/I(100) is not less than about 1.5.

In a particularly preferred embodiment, the I(001), I(100) and I(101) of the XRD pattern of the precursor satisfy the following relationships: I(001)/I(100) is not less than about 1.8 and not greater than about 10, for example not greater than about 5 or not greater than about 3; I(001)/I(101) is not less than about 1.3 and not greater than about 5, for example not greater than about 3 or not greater than about 2; and I(101)/I(100) is not less than about 1.5 and not greater than about 5, for example not greater than about 3 or not greater than about 2.

In a preferred embodiment, in the chemical formula of the precursor, $0.6 \leq x \leq 0.95$, $0.025 \leq y \leq 0.2$, and $0.025 \leq z \leq 0.2$.

In preferred embodiments, M is at least one of Mn, Al and Mg, or a combination of at least one of Mn, Al and Mg with at least one selected from the group consisting of Fe, Cr, Cu, Ti, W, Mo, Nb, Zn, Sn, Zr and Ga. For example, the precursor may have the formula $Ni_xCo_yMn_z(OH)_2$, $Ni_xCo_yAl_z(OH)_2$ or $Ni_xCo_yMg_z(OH)_2$, where x, y and z are as previously defined.

Figure 1B:
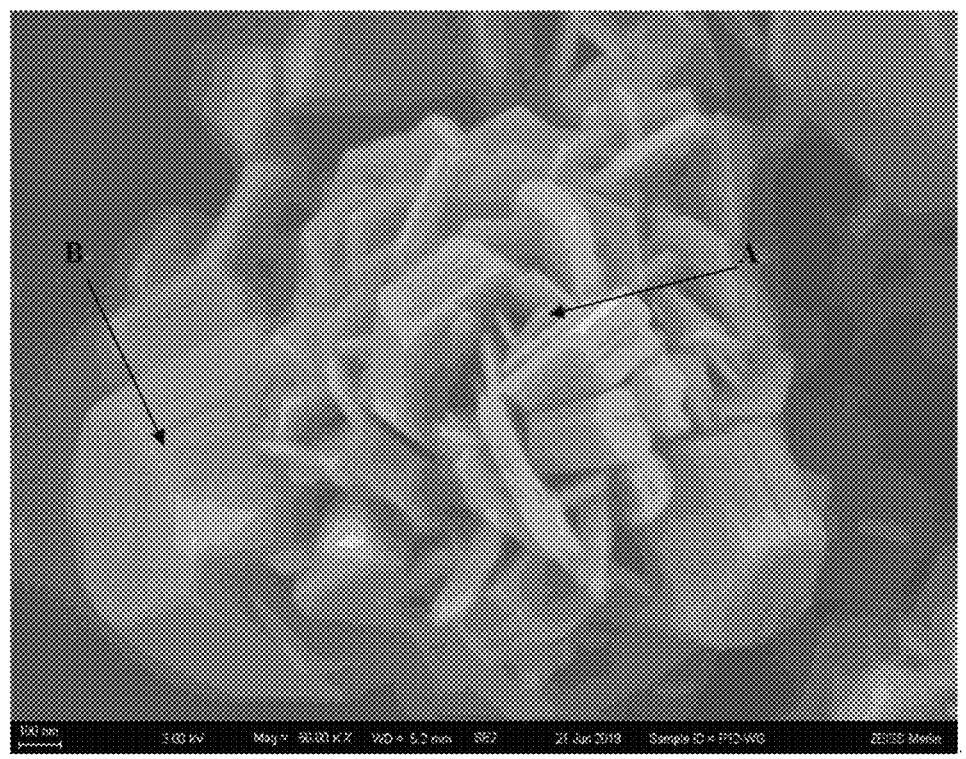
FIG. 1B is an SEM image of the positive active material precursor obtained in Example 1 of the present application.

In a preferred embodiment of the present application, SEM images of the precursor may be as shown in FIGS. 1A and 1B. As can be seen from FIGS. 1A and 1B, the lithium battery positive active material precursor according to the present application comprises aggregates of platy monocrystals and polyhedral monocrystal particles. As can be seen from FIG. 2, the positive active material precursor has at least three diffraction peaks including a (001) diffraction peak at 2θ of about 19.6°, a (100) diffraction peak at 2θ of about 33.4°, and a (101) diffraction peak at 2θ of about 38.8°. The diffraction peaks of the precursor are sharp, which indicates that the crystal structure of the precursor is well developed, and the intensities of the diffraction peaks corresponding to the (001) and (101) crystal faces are relatively higher, which indicates that the (001) and (101) crystal faces, especially the (001) crystal face, of the precursor are more adequately exposed. The lithium battery positive active material precursor is significantly different from existing positive active material precursors with a spherical polycrystal aggregate morphology, in which existing spherical polycrystal aggregates show a spherical or spheroidal morphology, and the intensities of their diffraction peaks (especially the intensities of (001) and/or (101) crystal faces) are significantly lower than those of the precursor material of the present application.

According to the present application, the particle size (D50) of the positive active material precursor is preferably 2 μm to 12 μm, as determined by dynamic light scattering.

In a second aspect, the present application provides a method for preparing a lithium battery positive active material precursor, comprising the steps of:

(1) mixing a metal salt solution with a precipitant solution and a complexing agent solution for reaction, wherein the precipitant solution and the complexing agent solution are continuously fed into the reaction system, while the metal salt solution is intermittently fed into the reaction system;

(2) carrying out solid-liquid separation and drying treatment on the product obtained in step (1) to obtain the positive active material precursor;

wherein the metal in the metal salt solution comprises Ni, Co and M, the metal M is at least one selected from the group consisting of Fe, Cr, Cu, Ti, Mg, W, Mo, Nb, Zn, Sn, Zr, Ga, Mn and Al, and the molar ratio among the metals Ni, Co and M is about (0.3-1):(0-0.5):(0-0.3), and wherein the amounts by mole of Co and M used are not zero.

The inventors of the present application unexpectedly found that, in the preparation of lithium battery positive active material precursors, precursors obtained via continuous feeding of starting materials typically show a spherical polycrystal aggregate morphology, but when an intermittent feeding of the metal salt solution is performed, a precursor comprising aggregates of platy monocrystals and polyhedral monocrystal particles can be obtained, and such precursor with the special morphology shows an improved electrochemical property.

In a preferred embodiment, the molar ratio among the metals Ni, Co and M in the metal salt solution is about (0.6-0.95):(0.025-0.2):(0.025-0.2).

In the present application, the metal salt solution may be any metal salt solution conventionally used in the art for the preparation of a lithium battery positive active material or positive active material precursor. Preferably, the metal M is at least one of Mn, Al, and Mg, or a combination of at least one of Mn, Al, and Mg with at least one selected from the group consisting of Fe, Cr, Cu, Ti, W, Mo, Nb, Zn, Sn, Zr, and Ga. For example, the metal in the metal salt solution may be a combination of Ni, Co, and Mn, a combination of Ni, Co, and Al, or a combination of Ni, Co, and Mg.

In the present application, the type of the metal salt forming the metal salt solution is not particularly limited. Preferably, the metal salt is at least one selected from the group consisting of sulfate, nitrate, acetate, chloride and oxalate. For example, the salt of metal Ni can be at least one selected from nickel sulfate, nickel nitrate, nickel acetate, nickel oxalate, and nickel chloride; the salt of metal Co can be at least one selected from cobalt nitrate, cobalt chloride, cobalt acetate and cobalt sulfate; the salt of metal Mn can be at least one selected from manganese sulfate, manganese nitrate, manganese acetate and manganese chloride; the salt of metal Al can be at least one selected from aluminum nitrate, aluminum chloride, aluminum acetate, and aluminum sulfate; and the salt of metal Mg can be at least one selected from magnesium nitrate, magnesium chloride, magnesium acetate, and magnesium sulfate.

In a preferred embodiment, the metal salt solution has a concentration, calculated on the basis of metal element(s), of about 0.0-5 mol/L, such as about 0.01 mol/L, about 0.1 mol/L, about 0.5 mol/L, about 1 mol/L, about 2 mol/L, about 3 mol/L, about 4 mol/L, about 5 mol/L, or within a range formed between any two of these values, more preferably about 0.5-3 mol/L, and even more preferably about 1-2 mol/L.

In the present application, the type of the precipitant is not particularly limited. Preferably, the precipitant can be at least one selected from NaOH, KOH, and LiOH.

In the present application, the concentration of the precipitant solution is not particularly limited. Preferably, the concentration of the precipitant solution can be about 0.02-10 mol/L, such as about 0.02 mol/L, about 0.1 mol/L, about 0.5 mol/L, about 1 mol/L, about 2 mol/L, about 3 mol/L, about 4 mol/L, about 5 mol/L, about 6 mol/L, about 7 mol/L, about 8 mol/L, about 9 mol/L, about 10 mol/L, or within a range formed between any two of these values, more preferably about 2-8 mol/L, and even more preferably about 2-6 mol/L.

In the present application, the type of the complexing agent is not particularly limited, and it may be any compound capable of forming a complex with Ni, Co and M in an aqueous solution. Preferably, the complexing agent is at least one selected from the group consisting of ammonium ion donor, ethanolamines complexing agent, aminocarboxylic acids complexing agent, hydroxyaminocarboxylic acids complexing agent, and carboxylates complexing agent. For example, the ammonium ion donor is preferably at least one selected from the group consisting of aqueous ammonia, ammonium oxalate, ammonium carbonate and ammonium hydroxide; the ethanolamines complexing agent is preferably diethanolamine; the aminocarboxylic acids complexing agent is preferably at least one selected from trisodium nitrilotriacetate (NTA), ethylenediamine tetraacetic acid and salts thereof (EDTA) and diethylenetriamine pentaacetic acid (DTPA); the hydroxyaminocarboxylic acids complexing agent is preferably at least one selected from the group consisting of hydroxyethylenediamine tetraacetic acid (HEDTA), ethyleneglycol bis(β-diaminoethyl) ethylether-N,N,N'-tetraacetic acid (EGTA) and salts thereof, and dihydroxyglycine and salts thereof; the carboxylates complexing agent is preferably at least one selected from the group consisting of oxalic acid and salts thereof, tartaric acid and salts thereof, citric acid and salts thereof, gluconic acid and salts thereof, carboxymethyl hydroxymalonic acid (CMOM) and salts thereof, carboxymethyl hydroxysuccinic acid (CMOS) and salts thereof, and hydroxyethyl glycine (DHEG) and salts thereof.

In the present application, the concentration of the complexing agent solution is not particularly limited. Preferably, the concentration of the complexing agent solution is about 0.01-15 mol/L, such as about 0.01 mol/L, about 0.1 mol/L, about 0.5 mol/L, about 1 mol/L, about 2 mol/L, about 3 mol/L, about 4 mol/L, about 5 mol/L, about 6 mol/L, about 7 mol/L, about 8 mol/L, about 9 mol/L, about 10 mol/L, about 11 mol/L, about 12 mol/L, about 13 mol/L, about 14 mol/L, about 15 mol/L, or within a range formed between any two of these values, further preferably about 2-10 mol/L, more preferably about 2-6 mol/L.

According to the present application, the reaction conditions in step (1) preferably include: a temperature of about 30-70° C., preferably about 45-60° C.; a reaction time of not less than about 10 hours, preferably about 24-72 hours; a pH of about 9-14, preferably about 9-12, and the metal salt solution is fed to the reaction system in at least two portions. By controlling the temperature and/or time of the reaction, the growth of the crystal of the precursor can be controlled.

In a preferred embodiment, step (1) further comprises:
(1a) continuously feeding said metal salt solution, said precipitant solution and said complexing agent solution into a reactor, allowing them to mix and react for about 2-12 hours, preferably about 3-8 hours;
(1b) suspending the feeding of the metal salt solution for about 0.5-4 hours, preferably about 1-3 hours;
(1c) repeating the steps (1a)-(1b) until the reaction is completed.

In a still further preferred embodiment, the duration of each step (1a) is not more than about ⅚, preferably not more than about ⅔, of the total time of step (1).

According to the present application, in step (1), the pH of the reaction system is controlled to be in a range of about 9-14, preferably in a range of about 9-12. Particularly, in step (1a), the pH of the reaction system is controlled to be in a range of about 9-12, preferably in a range of about 10-11.5.

According to the present application, the amounts of the metal salt, the precipitant and the complexing agent may be selected within wide limits, and the molar ratio between the metal salt, the precipitant and the complexing agent may typically be about 1:(1.5-3):(0.5-6).

According to the present application, the feed rate of each reactant may be selected within a wide range as long as the feed rate is sufficient to maintain the pH of the reaction system in step (1), particularly step (1a), within the predetermined range. Generally, an appropriate reactor size can be selected based on the total amount of the reactants, and then an appropriate feed rate can be determined based on the factors such as reactor size and reaction time, which can be readily determined by those skilled in the art based on the present disclosure.

According to the present application, in the continuous feeding stage of step (1) (e.g., step (1a)), the ratio by volume between the feed rates of the metal salt solution and the complexing agent solution may be generally about 0.5-6, and the feed rate of the precipitant is controlled to a level sufficient to maintain the pH of the reaction system in the predetermined range.

In some preferred embodiments, the metal salt solution is fed at a rate of about 10-200 mL/h, based on 1 L metal salt solution in total; the precipitant solution is fed at a rate of about 10-200 mL/h, based on 1L precipitant solution in total; the complexing agent solution is fed at a rate of about 10-200 mL/h, based on 1L complexing agent solution in total. The feed rate can be controlled by those skilled in the art in accordance with the pH required.

It should be noted that the feed rate of the metal salt solution is about 10-200 mL/h based on 1L metal salt solution in total means that the feed rate of the metal salt solution is about 10-200 mL/h per 1 L metal salt solution in the case that the reactor size is matched with the total amount of the reactants. For example, when the total amount of the metal salt solution is 0.5 L, the feed rate of the metal salt solution is about 5-100 mL/h; and when the total amount of the metal salt solution is 5 L, the feed rate of the metal salt solution is about 50-1000 mL/h.

In the present application, the manner in which each reactant is fed is not particularly limited, and the feeding may be performed in any conventional manner known in the art, for example, may be performed in a dropwise manner.

In a preferred embodiment, the mixing in step (1) is performed under stirring, more preferably, the stirring speed is about 50-1000 r/min, such as about 50 r/min, about 80 r/min, about 100 r/min, about 200 r/min, about 300 r/min, about 400 r/min, about 500 r/min, about 600 r/min, about 700 r/min, about 800 r/min, about 900 r/min, about 1000 r/min, or within a range formed between any two of these values, and further preferably about 600-1000 r/min.

In the present application, it is preferable that the product obtained in step (1) is subjected to a cooling treatment before being subjected to the solid-liquid separation. After the cooling treatment, the temperature of the product is preferably reduced to room temperature, which may be about 25° C., for example.

In the present application, the solid-liquid separation in step (2) can be performed in any suitable manner, as long as the precursor obtained can be separated out, for example, filtration or centrifugation can be used.

In the present application, it is preferable that the product obtained by the solid-liquid separation is subjected to a washing treatment.

In the present application, the drying treatment in step (2) can be performed in any manner conventional in the art, such as by vacuum drying, air drying, freeze drying or oven drying. The conditions of the drying treatment can be selected within a wide range, for example, a temperature of about 70-150° C. and a time of about 4-16 h.

In a third aspect, the present application provides a lithium battery positive active material precursor obtained by the above method for preparing a lithium battery positive active material precursor.

The characteristics of the lithium battery positive active material precursor according to the third aspect of the present application are as described above in the first aspect of the present application, and a description thereof is omitted here.

In a fourth aspect, the present application provides a lithium battery positive active material, which comprises particles in the form of secondary fusion body of monocrystals formed by primary monocrystal particles that are at least partially fused;
the positive active material has a chemical formula of $Li_aNi_xCo_yM_zO_2$, wherein M is at least one metal selected from the group consisting of Fe, Cr, Cu, Ti, Mg, W, Mo, Nb, Zn, Sn, Zr, Ga, Mn and Al, $0.9 \leq a \leq 1.2$, $0.3 \leq x \leq 1$, $0 < y \leq 0.5$, $0 < z \leq 0.3$, and the values of a, x, y and z meet the electroneutrality rule.

According to the present application, the positive active material comprises particles in the form of secondary fusion body of monocrystals formed by primary monocrystal particles that are at least partially fused, preferably the positive active material consists substantially of particles in the form of secondary fusion body of monocrystals.

According to the present application, the term "primary monocrystal particle(s)" refers to primary particle(s) constituting the positive active material, which generally has a polyhedral-like morphology, particularly a cuboid-like morphology. Generally, the primary monocrystal particles are not uniform in size, which helps to increase the tap density of the material. The term "secondary fusion body of monocrystals" refers to a fusion body formed by at least partially fusing the above-mentioned primary monocrystal particles, and is normally formed by no less than 5 primary monocrystal particles. In some embodiments, the secondary fusion body of monocrystals is present as an irregularly shaped solid particle having a plurality of protrusions on its surface.

In a preferred embodiment, the positive active material has a layered crystal structure.

Figure 3A:
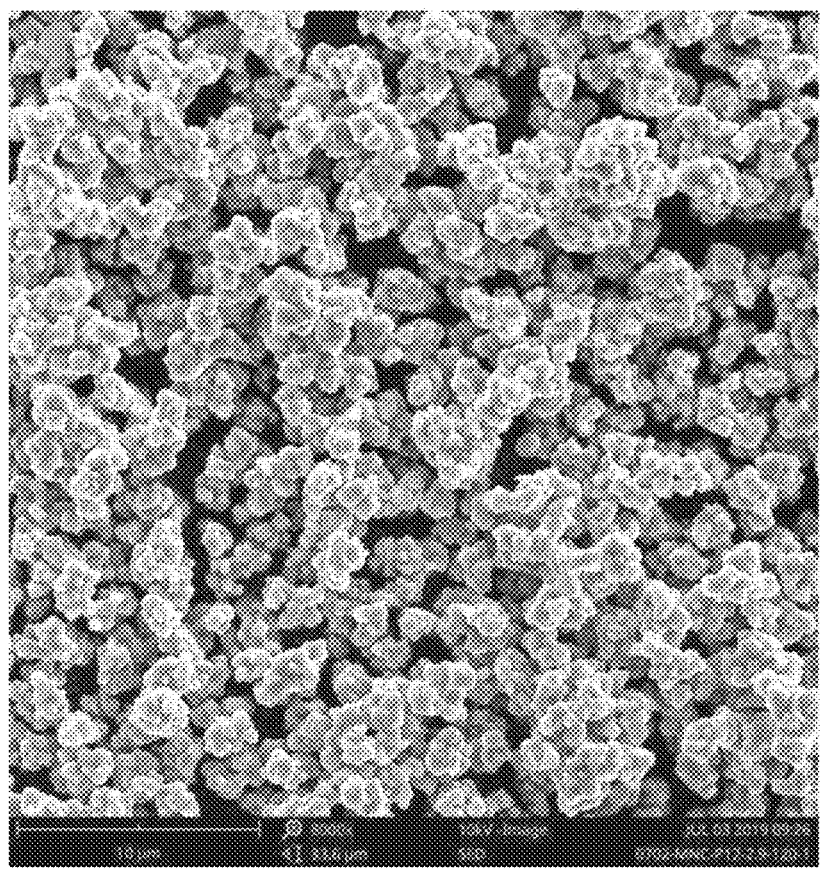
FIG. 3A is an SEM image of the positive active material obtained in Example 1 of the present application.
Figure 3B:
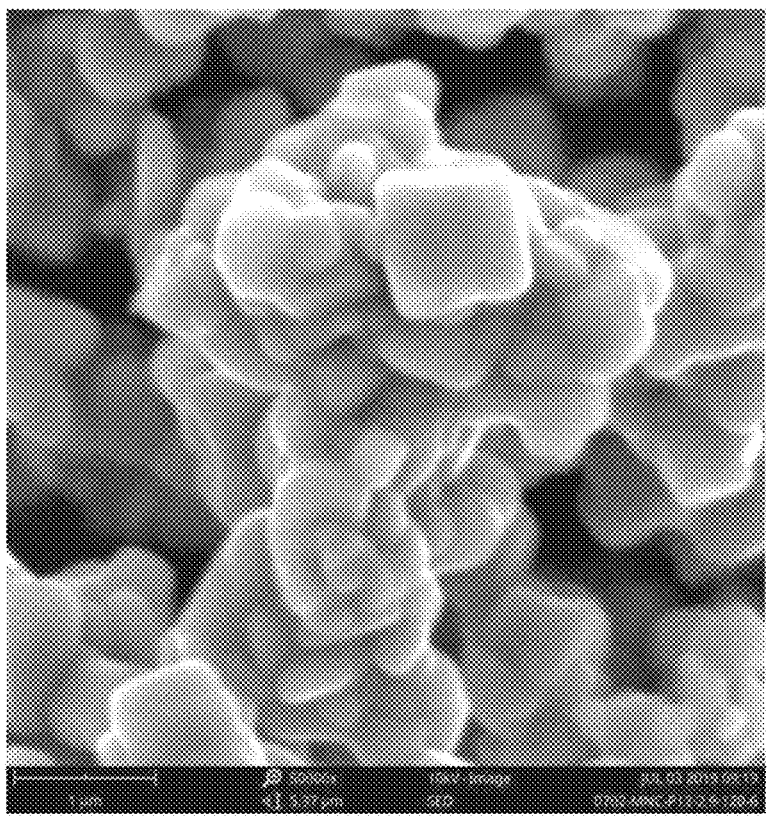
FIG. 3B is an SEM image of the positive active material obtained in Example 1 of the present application.
Figure 3C:
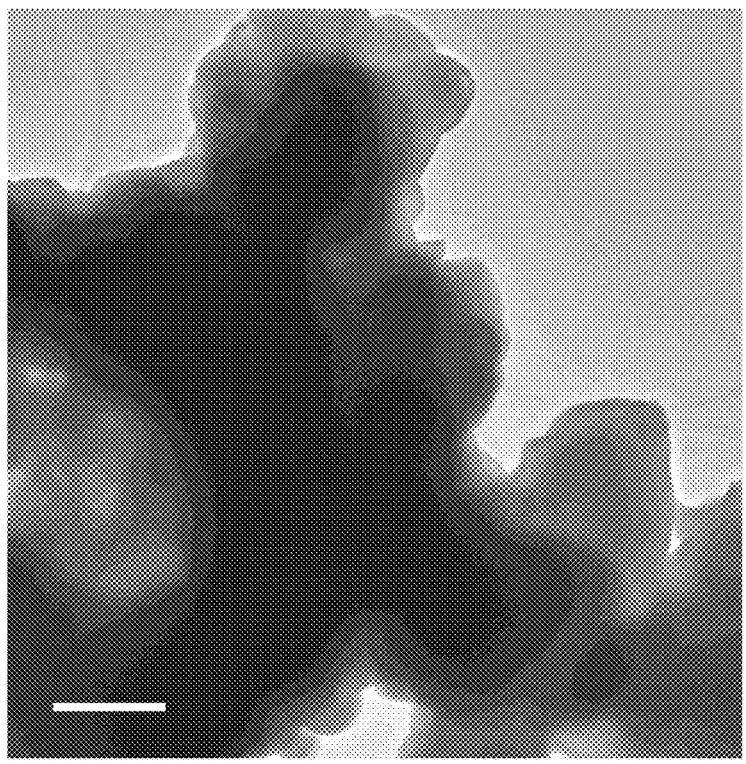
FIG. 3C is a TEM image of the positive active material obtained in Example 1 of the present application.
Figure 3D:
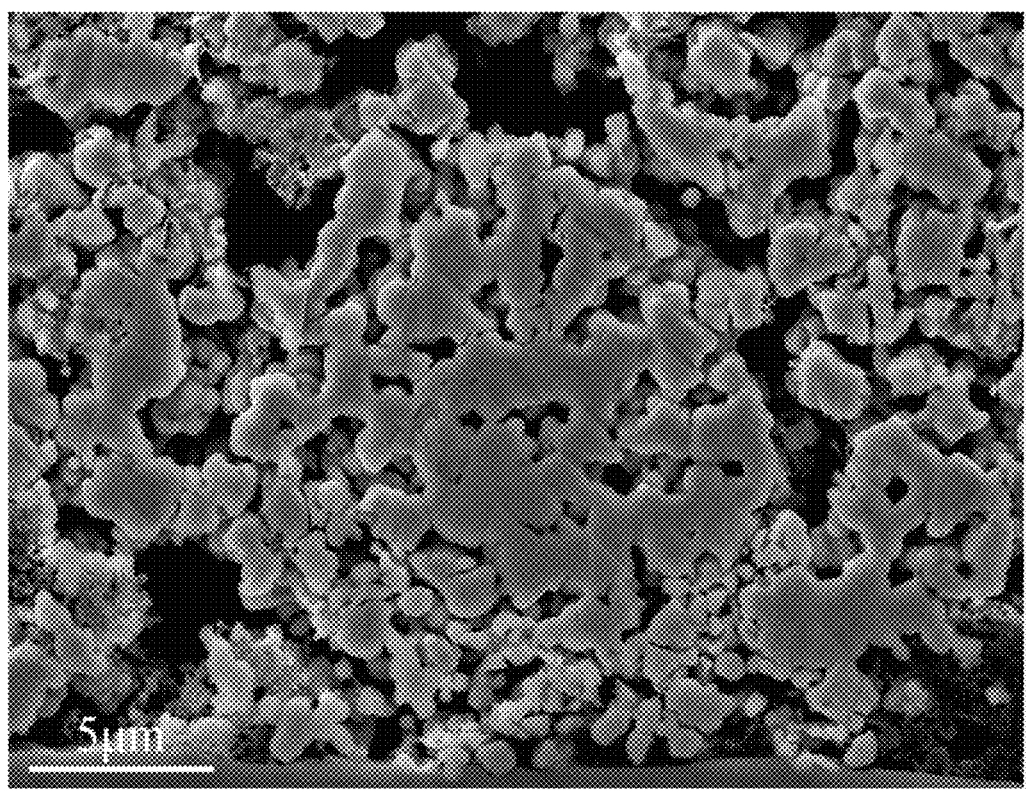
FIG. 3D is an SEM image of a cross section of the positive active material obtained in Example 1 of the present application.

In a preferred embodiment of the present application, the SEM images of the positive active material are shown in FIGS. 3A and 3B, and the particle morphology of the positive active material is secondary fusion body of monocrystals formed by primary monocrystal particles that are at least partially fused. Particularly, the primary monocrystal particles have a cuboid-like morphology and are not uniform in size; not less than 5 primary monocrystal particles are fused with each other to form a secondary fusion body of monocrystals. A TEM image of the positive active material is shown in FIG. 3C. FIG. 3C further shows that the particle morphology of the positive active material is fusion body formed by primary monocrystal particles that are at least partially fused. An SEM image of a cross section of the positive active material is shown in FIG. 3D. FIG. 3D more clearly shows that the particle morphology of the positive active material is fusion body formed by primary monocrystal particles that are at least partially fused.

In a preferred embodiment, the primary monocrystal particles have an average size of about 0.2-3 µm and the secondary fusion body of monocrystals has an average particle size of about 0.5-15 µm. According to the present application, the average particle size can be determined by dynamic light scattering.

In a preferred embodiment, the positive active material has characteristic diffraction peaks in its XRD pattern at 2θ of about 18.6°, about 36.5° and about 44.3°, respectively, wherein the ratio of the intensity of the diffraction peak at 2θ of about 18.6° to the intensity of the diffraction peak at 2θ of about 44.3° is about 1.5 or more, more preferably about 1.7 or more, wherein the intensity of the diffraction peak is calculated as the height of the diffraction peak.

Figure 4:
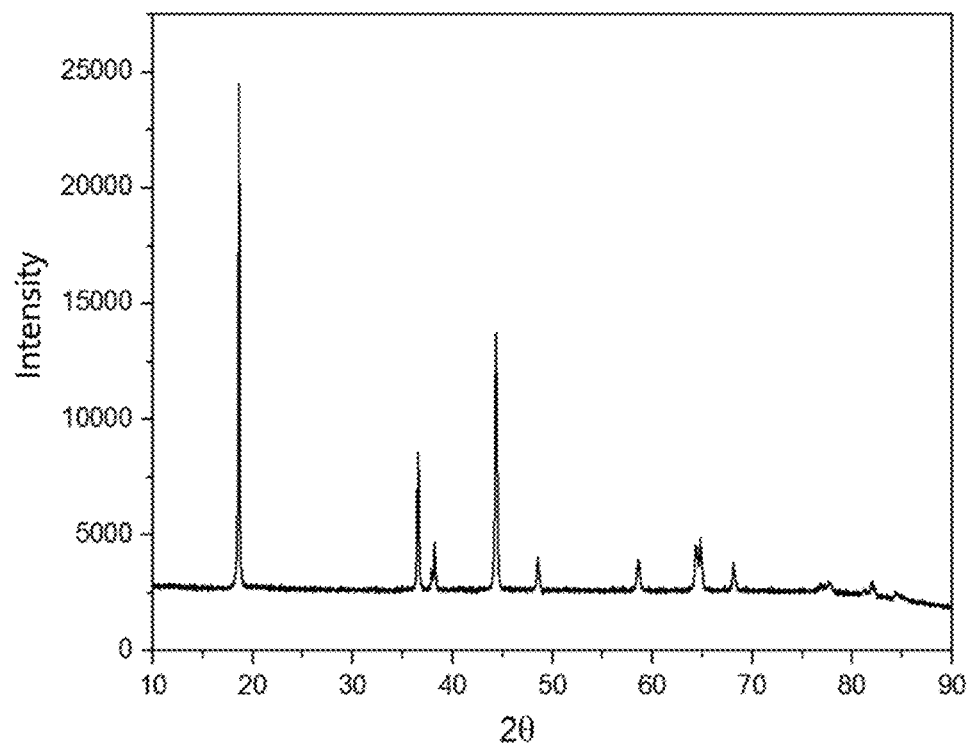
FIG. 4 shows an XRD pattern of the positive active material obtained in Example 1 of the present application.

In a preferred embodiment, as shown in FIG. 4, the diffraction peak of the positive active material is very sharp, indicating that the crystal structure of the positive active material is well developed; and no impurity peak is shown in the pattern, indicating that the positive active material has a relatively higher purity. In the XRD pattern of the positive active material shown in FIG. 4, characteristic diffraction peaks are present at 2θ of about 18.6°, about 36.5° and about 44.3°, respectively, wherein the ratio of the intensity of the diffraction peak at 2θ of about 18.6° to the intensity of the diffraction peak at 2θ of 44.3° is about 1.8; and the diffraction peak at 2θ of about 65° is split obviously, indicating that the positive active material has a good layered crystal structure.

In a fifth aspect, the present application provides a method for preparing a lithium battery positive active material, comprising the steps of:
 (I) providing a lithium battery positive active material precursor;
 (II) mixing the precursor with a lithium source to carry out solid-phase reaction to obtain the positive active material;
 wherein the precursor is the lithium battery positive active material precursor according to the first aspect or the third aspect of the present application.

According to this aspect of the present application, the characteristics of the lithium battery positive active material precursor provided in step (I) are as described in the first aspect or the third aspect of the present application, and a description thereof is omitted here.

In a preferred embodiment, step (I) further comprises preparing the lithium battery positive active material precursor according to the method for preparing the lithium battery positive active material precursor as described in the second aspect of the present application. In this preferred embodiment, the features of the method for preparing the lithium battery positive active material precursor are as described in the second aspect of the present application, and a description thereof is omitted here.

During research, the inventors of the present application unexpectedly found that, in the preparation of positive active material, when the precursor comprising aggregates of platy monocrystals and polyhedral monocrystal particles according to the present application is used or a positive active material precursor is prepared by intermittently feeding the metal salt solution, the final positive active material obtained will have a special morphology, and the particle morphology of the positive active material is secondary fusion body of monocrystals formed by primary monocrystal particles that are at least partially fused, and the special morphology gives the positive active material an improved electrochemical property.

The lithium source used herein is not particularly limited and may be various lithium sources conventionally used in the preparation of ternary positive active materials for lithium batteries. In a preferred embodiment, the lithium source used in step (II) is at least one selected from the group consisting of lithium nitrate, lithium chloride, lithium carbonate, lithium hydroxide and lithium acetate.

In a further preferred embodiment, the molar ratio of the lithium source to the precursor, calculated on the basis of metal elements, is from about 0.9:1 to about 1.2:1, and may be, for example, about 0.9:1, about 1.0:1, about 1.1:1, about 1.2:1, or within a range formed between any two of these ratios.

In the present application, the mixing in step (II) can be carried out in any manner with no particular limitation, such as by ball milling, shearing, grinding, blending, etc., as long as a uniform mixing between the lithium source and the lithium battery positive active material precursor can be achieved. Preferably, the mixing time is about 1-4 hours.

In the present application, the solid-phase reaction described in step (II) may be performed by a conventional manner used in the art for preparing a lithium battery positive active material.

In a preferred embodiment, the solid-phase reaction is performed by subjecting the mixture of the precursor and the lithium source to a calcination treatment. The calcination treatment may be carried out in a conventional manner, and there is not particular limitation in the present application.

In a further preferred embodiment, the calcination treatment comprises a first calcination and a second calcination, wherein:
 the conditions of the first calcination preferably include: a calcining temperature of about 300-600° C., such as about 300° C., about 350° C., about 400° C., about 450° C., about 500° C., about 550° C., about 600° C., or within a range formed between any two of these values, more preferably, a calcining temperature of about 450-550° C.; a calcining time of from about 1 hour to about 10 hours, such as about 1 hour, about 2 hours, about 3 hours, about 4 hours, about 5 hours, about 6 hours, about 7 hours, about 8 hours, about 9 hours, about 10 hours, or within a range formed between any two of these values, and more preferably, a calcining time of from about 4 hours to about 8 hours;
 the conditions of the second calcination preferably include: a calcining temperature of about 650-1000° C., such as about 650° C., about 700° C., about 750° C., about 800° C., about 850° C., about 900° C., about 950°

C., about 1000° C., or within a range formed between any two of these values, and more preferably, a calcining temperature of about 750-900° C.; a calcining time of from about 4 hours to about 48 hours, such as about 4 hours, about 8 hours, about 12 hours, about 16 hours, about 20 hours, about 24 hours, about 28 hours, about 32 hours, about 36 hours, about 40 hours, about 44 hours, about 48 hours, or within a range formed between any two of these values, and more preferably, a calcining time of from about 8 hours to about 24 hours.

In the preferred embodiment, the rate of the temperature rising process for raising the temperature to the first calcination temperature and the second calcination temperature is not particularly limited, but is preferably about 0.5-10° C./min, for example, about 0.5° C./min, about 1° C./min, about 2° C./min, about 3° C./min, about 5° C./min, about 10° C./min, or within a range formed between any two of these values.

In the present application, in order to obtain an improved electrochemical property, a multi-stage calcination process comprising a first calcination and a second calcination is preferably adopted, or alternatively a single calcination may be performed directly under the conditions used in the second calcination, by which a good electrochemical property may also be obtained.

In a sixth aspect, the present application provides a positive active material obtained by the method for preparing the lithium battery positive active material as described above.

The characteristics of the lithium battery positive active material according to the sixth aspect of the present application are as described in the fourth aspect of the present application, and a description thereof is omitted here.

In a seventh aspect, the present application provides the use of a lithium battery positive active material precursor or positive active material according to the present application in the preparation of a lithium battery positive electrode.

The method for preparing a lithium battery positive electrode by using the lithium battery positive active material precursor or positive active material is well known in the art, of which a detailed description is omitted here.

In an eighth aspect, the present application provides a lithium battery positive electrode, comprising a positive active material, a binder, and a conductive agent, wherein the positive active material is the positive active material according to the fourth aspect or sixth aspect of the present application.

In the present application, the conductive agent and the binder may be various conductive agents and binders conventionally used in the art, for example, the conductive agent may be acetylene black, carbon nanotubes, graphene, conductive polymer material, and the like, and the binder may be polyvinylidene fluoride, polytetrafluoroethylene, polyvinyl alcohol, and the like, of which a detailed description is omitted here. The amount of the conductive agent and the binder may be any amount conventionally used in the art, for example, the mass content of the positive active material may be about 50-98%, the mass content of the conductive agent may be about 1-25%, and the mass content of the binder may be about 1-25%, based on the total amount of the positive electrode.

In the present application, the lithium battery positive electrode may be prepared by various methods known in the art with no particular limitation, and the method may be selected as needed by those skilled in the art. For example, in some embodiments, the positive active material, conductive agent, and binder may be uniformly mixed, applied, and sliced to provide the lithium battery positive electrode.

In a ninth aspect, the present application provides a lithium battery comprising a positive electrode, a negative electrode, an electrolyte, and a separator, wherein the positive electrode is the lithium battery positive electrode according to the eighth aspect of the present application.

In the present application, the negative electrode, electrolyte, and separator may be those conventionally used in lithium batteries, and there is no particular limitation in the present application. For example, the negative electrode may be selected from the group consisting of natural graphite, artificial graphite, soft carbon, hard carbon, mesophase microspheres, silicon, silicon/carbon composite, lithium, and the like; the electrolyte may be selected from the group consisting of liquid electrolytes, gel electrolytes, solid electrolytes, and the like; the separator may be selected from the group consisting of polyethylene separator, polypropylene separator, polyethylene/propylene composite separator, polyimide separator, and the like.

In some preferred embodiments, the present application provides the following technical solutions:

1. A positive active material precursor, characterized in that, it comprises aggregates of platy monocrystals and polyhedral monocrystal particles, wherein I(001), I(100) and I(101) of the XRD pattern of the positive active material precursor satisfy the following relations: I(001)/I(100) is not less than 1.5, and I(001)/I(101) is not less than 1.2;

the positive active material precursor has a chemical formula of $Ni_xCo_yM_z(OH)_2$, wherein M is at least one selected from the group consisting of Fe, Cr, Cu, Ti, Mg, W, Mo, Nb, Zn, Sn, Zr, Ga, Mn and Al; and wherein $0.3 \leq x \leq 1$, $0 \leq y \leq 0.5$, $0 \leq z \leq 0.3$.

2. A method for preparing a positive active material precursor, characterized in that, it comprises the steps of:

(1) intermittently adding dropwise a metal salt solution, a precipitant solution and optionally a complexing agent solution for mixing and reaction;

(2) carrying out solid-liquid separation and drying treatment on the product obtained in step (1) to obtain the positive active material precursor;

the metal salt solution comprises metal elements Ni, Co and M, wherein M is at least one selected from the group consisting of Fe, Cr, Cu, Ti, Mg, W, Mo, Nb, Zn, Sn, Zr, Ga, Mn and Al;

wherein the molar ratio among the Ni element, the Co element and the M element used is (0.3-1):(0-0.5):(0-0.3), and wherein the amounts by mole of Co and M used are not zero.

3. The method according to Item 2, wherein the metal salt solution comprises a combination of Ni, Co, and Mn or a combination of Ni, Co, and Al as the metal element;

preferably, the metal salt solution comprises at least one metal salt selected from the group consisting of metal sulfate, metal nitrate, metal acetate and metal oxalate;

preferably, the metal salt solution has a concentration of 0.01-5 mol/L, calculated on the basis of metal elements.

4. The method according to Item 2, wherein the precipitant is at least one selected from the group consisting of NaOH, KOH and LiOH;

preferably, the precipitant solution has a concentration of 0.02-10 mol/L.

5. The method according to Item 2, wherein the complexing agent is at least one selected from the group consisting of ammonium ion donor, ethanolamines complexing agent, aminocarboxylic acids complexing agent, hydroxyaminocarboxylic acids complexing agent and carboxylates complexing agent;

preferably, the complexing agent solution has a concentration of 0.01-15 mol/L.

6. The method according to any one of Items 2 to 5, wherein, in step (1), the intermittently adding process comprises:

(1) simultaneously adding dropwise the metal salt solution, the precipitant solution and the optional complexing agent solution, under reaction conditions, into a reaction kettle;
(2) after 2-12 hours of simultaneous dropwise addition of the three solutions, suspending the feeding of the metal salt solution for 0.5-4 h; and
(3) repeating the intermittent dropwise addition of step (2) until the reaction is completed.

7. The method according to Item 2 or 6, wherein, in step (1), the conditions of the reaction include: a temperature of 30-70° C., preferably 45-60° C.; and a reaction time of not less than 10 h, preferably 24-72 h;

preferably, the mixing is performed under stirring;
more preferably, the stirring speed is 50-1000 r/min.

8. The positive active material precursor obtained by the method as defined in any one of Items 1 to 7.

9. A positive active material, characterized in that, it comprises the positive active material precursor according to Item 1 or 8 and lithium element;

preferably, the molar ratio of the lithium element to the positive active material precursor is 0.9-1.2:1, calculated on the basis of metal elements.

10. Use of the positive active material precursor according to Item 1 or 8 or the positive active material according to Item 9 in lithium batteries.

11. A positive active material, characterized in that, the positive active material has a morphology of secondary fusion body of monocrystals formed by primary monocrystal particles that are at least partially fused;

wherein the positive active material has a chemical formula of $LiNi_xCo_yM_zO_2$, and M is at least one selected from the group consisting of Fe, Cr, Cu, Ti, Mg, W, Mo, Nb, Zn, Sn, Zr, Ga, Mn and Al;

wherein $0.3 \leq x \leq 1$, $0 \leq y \leq 0.5$, $0 \leq z \leq 0.3$.

12. The positive active material according to Item 11, wherein the primary monocrystal particles have a size of 0.2-3 μm; and/or the secondary fusion body of monocrystals has an average particle size of 0.5-15 μm.

13. A method for preparing a positive active material, characterized in that, it comprises the steps of:

(1) intermittently adding dropwise a metal salt solution, a precipitant solution and optionally a complexing agent solution for mixing and reaction to obtain a precursor;
(2) mixing the precursor obtained in step (1) with a lithium source, and conducting a solid-phase reaction to obtain the positive active material;
the metal salt solution comprises metal elements of Ni, Co and M;
wherein M is at least one selected from the group consisting of Fe, Cr, Cu, Ti, Mg, W, Mo, Nb, Zn, Sn, Zr, Ga, Mn and Al;
the molar ratio among the Ni element, the Co element and the M element used is (0.3-1):(0-0.5):(0-0.3), and wherein the amounts by mole of Co and M used are not zero.

14. The method according to Item 13, wherein, in step (1), the intermittent adding process comprises:

(1) simultaneously adding dropwise the metal salt solution, the precipitant solution and optionally the complexing agent solution, under reaction conditions, into a reaction kettle;
(2) after 2-12 hours of simultaneous dropwise addition of the three solutions, suspending the feeding of the metal salt solution for 0.5-4 h; and
(3) repeating the intermittent dropwise addition of step (2) until the reaction is completed.

15. The method according to Item 13, wherein, in step (1), the reaction conditions include: a reaction temperature of 30-70° C., and a reaction time of not less than 10 h;

preferably, the reaction is carried out under stirring;
more preferably, the stirring speed is 50-1000 rpm.

16. The method according to Item 13, wherein, in step (2), the solid-phase reaction is conducted by subjecting a mixture of the precursor and the lithium source to a calcination treatment;

preferably, the calcination treatment comprises a first calcination and a second calcination;
more preferably, the conditions of the first calcination include: a calcination temperature of 300-600° C., and a calcination time of 1-10 h; and/or
the conditions of the second calcination include: a calcination temperature of 650-1000° C., and a calcination time of 4-48 h.

17. The method according to any one of Items 13 to 16, wherein the metal salt solution comprises a combination of Ni, Co, and Mn or a combination of Ni, Co, and Al as the metal element;

preferably, the metal salt solution comprises at least one metal salt selected from the group consisting of metal sulfate, metal nitrate, metal acetate and metal oxalate;
preferably, the metal salt solution has a concentration of 0.01-5 mol/L, calculated on the basis of metal elements.

18. The method according to any one of Items 13-16, wherein the precipitant is at least one selected from the group consisting of NaOH, KOH, and LiOH;

preferably, the precipitant solution has a concentration of 0.02-10 mol/L.

19. The method according to any one of Items 13 to 16, wherein the complexing agent is at least one selected from the group consisting of ammonium ion donor, ethanolamines complexing agent, aminocarboxylic acids complexing agent, hydroxyaminocarboxylic acids complexing agent, and carboxylates complexing agent;

preferably, the complexing agent solution has a concentration of 0.01-15 mol/L.

20. The method according to any one of Items 13-16, wherein the lithium source is at least one selected from the group consisting of lithium nitrate, lithium chloride, lithium carbonate, lithium hydroxide, and lithium acetate;

preferably, the molar ratio of the lithium source to the precursor is 0.9-1.2:1, calculated on the basis of metal elements.

21. The positive active material obtained by the method according to any one of Items 13 to 20.

22. A lithium battery positive electrode, characterized it that, it comprises a positive active material, a binder and a conductive agent;

wherein the positive active material is the positive active material as defined in any one of Items 11, 12, or 21;
preferably, the lithium battery positive electrode comprises 50-98 wt % of the positive active material, 1-25 wt % of the binder, and 1-25 wt % of the conductive agent.

23. Use of the positive active material as defined in any one of Items 11, 12, or 21 or the lithium battery positive electrode as defined in Item 22 in lithium batteries.

EXAMPLES

The present application will be described in detail by way of examples hereinbelow.

In the examples and comparative examples of the present application, the Scanning Electron Microscope (SEM) image was obtained by ZEISS Merlin scanning electron microscope of ZEISS company, Germany.

In the examples and comparative examples of the present application, the X-ray diffraction (XRD) pattern was measured by D8 Advance SS X-ray diffractometer of Bruker Corporation, Germany.

In the examples and comparative examples of the present application, the Transmission Electron Micrograph (TEM) image was obtained by FEI Titan Cubed Themis G2 300 spherical aberration correction transmission electron microscope of Thermo Fisher Company, USA. The sample preparation process for the transmission electron microscope detection is as follows: a small amount of powder sample was added into an ethanol solvent, subjected to ultrasonic dispersion at power of 140 W for 15 minutes, the supernatant liquid was sucked and added dropwise onto a copper mesh, the copper mesh was dried to remove the solvent, and then put into a sample bin for observation.

In the examples and comparative examples of the present application, the compositions of the precursor and the positive active material were measured by Varian 725 ES inductively coupled plasma spectroscopy (ICP-OES) of Agilent Technologies, USA.

In the examples and comparative examples of the present application, the procedure for preparing a cross-sectional sample of a positive active material was as follows: the positive active material, carbon black and PVDF (binder) were uniformly mixed at a mass ratio of 90:5:5, the resulted mixture was applied on an aluminum foil, and vacuum dried at 80° C. for 6 hours to obtain a pole piece comprising the positive active material. Then, the pole piece was cut using a clean blade, the cut pole piece was adhered on a sample table, and treated for 2 h using an accelerating voltage of 5 kV in a three-ion-beam section mode to obtain a flat and clean section for observation by scanning electron microscope.

In the following examples and comparative examples, the metal salt solutions used were all sulfate salt solutions.

Example 1

This example is provided for illustrating the preparation and evaluation of the positive active material precursor and the positive active material according to the present application (1) Preparation of Positive Active Material Precursor A metal salt solution with a metal ion concentration of 2 mol/L (wherein the molar ratio among nickel, cobalt and manganese elements was 8:1:1) was prepared; a NaOH solution with a concentration of 4 mol/L was prepared; and an aqueous ammonia solution with a concentration of 6 mol/L was prepared.

The prepared metal salt solution, NaOH solution and aqueous ammonia solution were added dropwise into a reaction kettle simultaneously under stirring to perform precipitation reaction. The dripping speed of the metal salt solution was 60 mL/h; the dripping speed of the ammonia solution was 60 mL/h, and the pH value of the reaction system was controlled to 11 by adjusting the dripping speed of the NaOH solution. After 6 hours of simultaneous dropwise addition of the three solutions, the feeding of the metal salt solution was suspended for 1 hour while keeping the feeding of the NaOH solution and the aqueous ammonia solution, and then the above process was repeated.

In the reaction process, the stirring speed was controlled to be 600 rpm, the reaction temperature was controlled to be 55° C., and the reaction time was controlled to be 48 h. The precipitation reaction was terminated after naturally cooling, the resulted slurry was subjected to vacuum filtration, washed with deionized water for 3 times, and then dried and dehydrated in a vacuum drying oven at 120° C. for 12 hours to obtain the positive active material precursor.

(2) Evaluation of Positive Active Material Precursor

The molar ratio of Ni to Co to Mn in the positive active material precursor obtained was 0.799:0.100:0.101. The SEM images of the positive active material precursor obtained are shown in FIGS. 1A and 1B, and it can be seen from the figures that the morphology of the positive active material precursor is obviously different from that of conventional spherical polycrystal aggregates, and the positive active material precursor consists of aggregates of platy monocrystals and polyhedral monocrystal particles.

Figure 2:
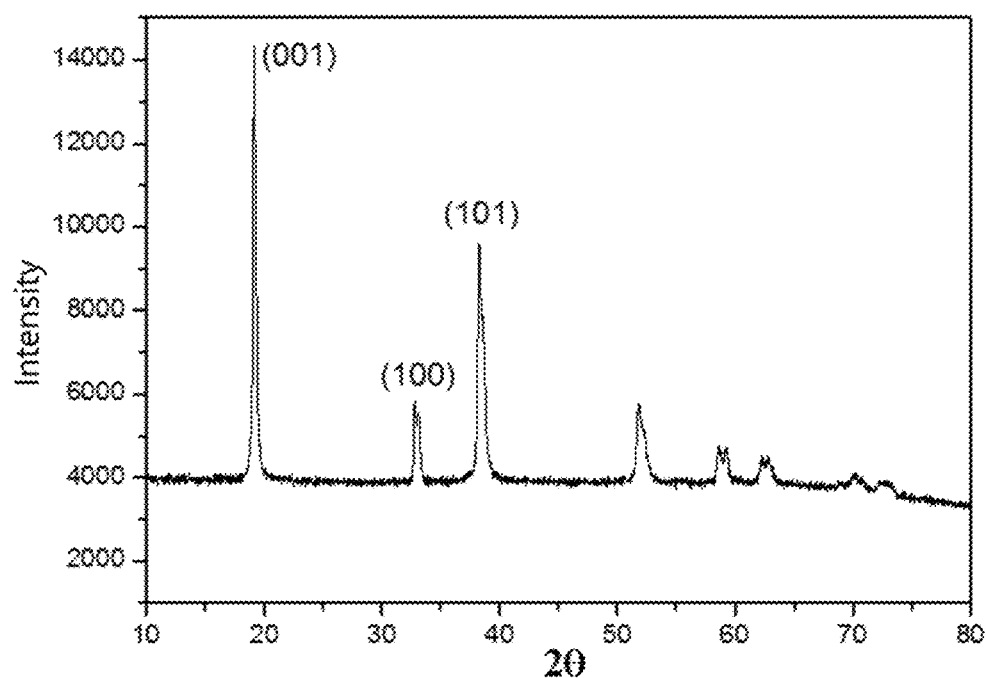
FIG. 2 shows an XRD pattern of the positive active material precursor obtained in Example 1 of the present application.

The XRD pattern of the positive active material precursor is shown in FIG. 2, in which the diffraction peak of the positive active material precursor is very sharp, indicating that the crystal structure of the positive active material precursor is well developed, the intensities of the diffraction peaks corresponding to the (001) and (101) crystal faces are relatively higher, particularly, the intensity of the diffraction peak corresponding to the (001) crystal face is obviously higher than that of other diffraction peaks, indicating that the (001) and (101) crystal faces, especially the (001) crystal face, of the positive active material precursor are more adequately exposed, the intensity ratio of I(001)/I(100) is 2.45, the intensity ratio of I(001)/I(101) is 1.45, and the intensity ratio of I(101)/I(100) is 1.69.

(3) Preparation of Positive Active Material 10 g of the positive active material precursor was taken, a lithium source LiOH·H$_2$O was added thereto to ensure that the molar ratio of Li:(Ni+Co+Mn) was 1.02:1, the resultant was ball-milled for 2 h and uniformly mixed, then loaded into a crucible, and subjected to a multi-stage calcination at elevated temperature, wherein in the first stage: the temperature was raised from room temperature to 450° C. at a rate of 5° C./min, and kept for 6 h, and in the second stage: the temperature was raised from 450° C. to 850° C. at a rate of 5° C./min, and kept for 12 h, and then the resultant was allowed to cool naturally to obtain the positive active material.

(4) Evaluation of Positive Active Material

The SEM images of the positive active material are shown in FIGS. 3A and 3B, and it can be seen from the figures that the particle morphology of the positive active material is secondary fusion body of monocrystals formed by primary monocrystal particles that are at least partially fused. The average size of the primary monocrystal particles of the positive active material is 0.2-3 μm; the average particle size of the secondary fusion body of monocrystals is 0.5-15 The TEM image of the positive active material is shown in FIG. 3C, and it can be clearly seen from FIG. 3C that after the ultrasonic dispersion treatment during the sample preparation process, the particle morphology of the positive active material still remains as a fusion body formed by primary monocrystal particles that at least partially fused. The SEM image of the cross section of the positive active material is shown in FIG. 3D, and it can be more visually and clearly seen that the primary monocrystal particles are fused with each other and grown together to form the particles in the form of secondary fusion body.

The XRD pattern of the positive active material is shown in FIG. 4, in which the diffraction peak of the positive active material is very sharp, indicating that the crystal structure of the positive active material is well developed; and no impurity peak is present in the pattern, indicating that the positive active material has a high purity. In the XRD pattern of the positive active material, characteristic diffraction peaks are present at 2θ of about 18.6°, about 36.5° and about 44.3°, respectively, wherein the ratio of the intensity of the diffraction peak at 2θ of about 18.6° to the intensity of the diffraction peak at 2θ of about 44.3° is 1.8; and the diffraction peak at 2θ of about 65° is split obviously, indicating that the positive active material has a good layered crystal structure.

Figure 5:
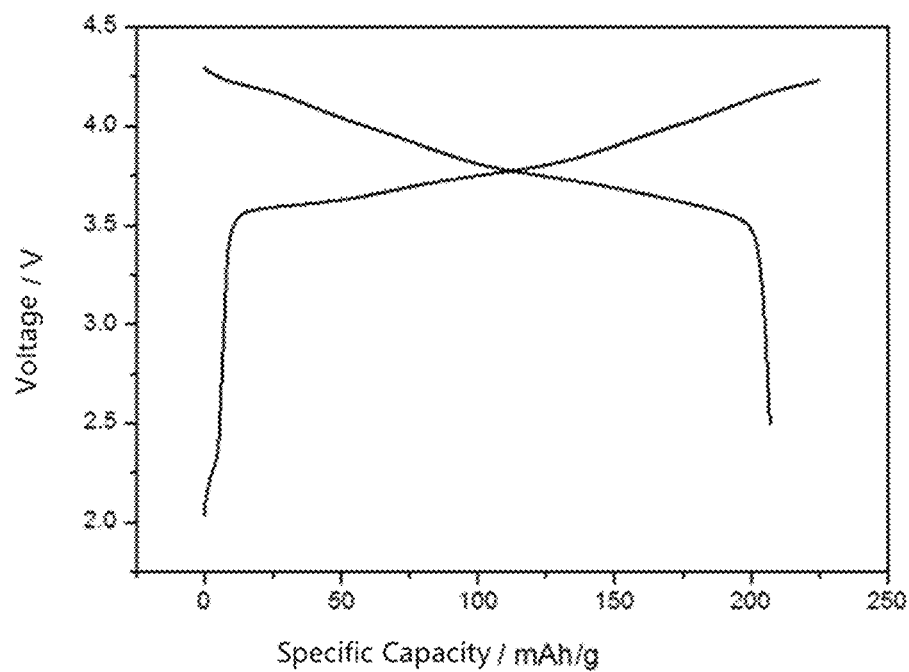
FIG. 5 shows a charge-discharge curve of a lithium battery assembled using the positive active material of Example 1 of the present application, measured at a rate of 0.1 C.
Figure 6:
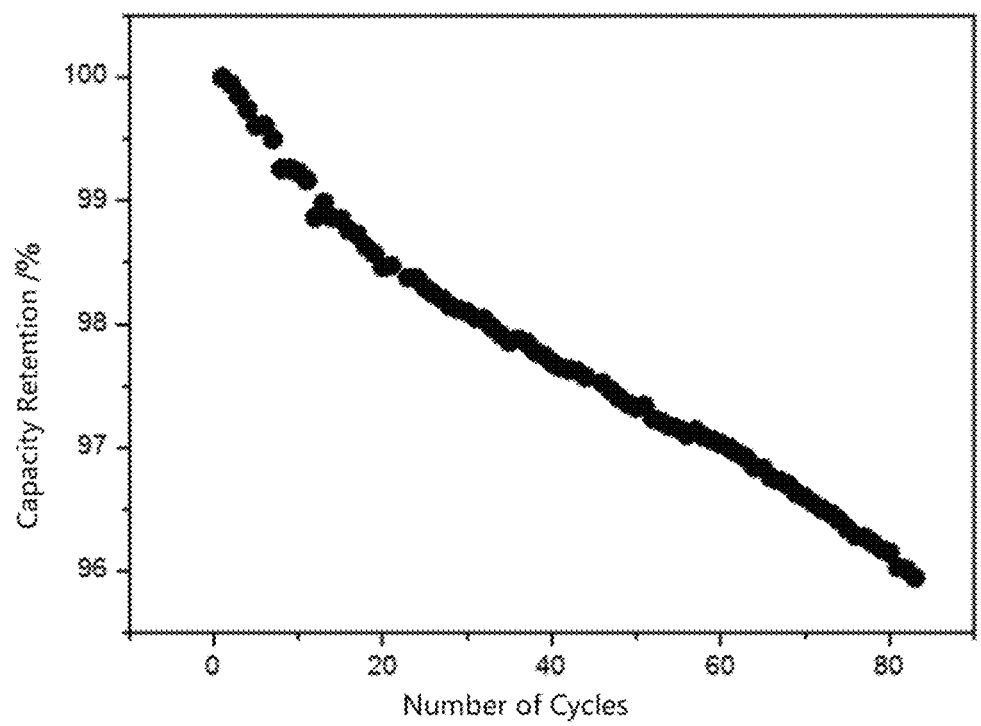
FIG. 6 shows a curve of cycling capacity retention of a lithium battery assembled using the positive active material of Example 1 of the present application, measured at a rate of 0.1 C.
Figure 7:
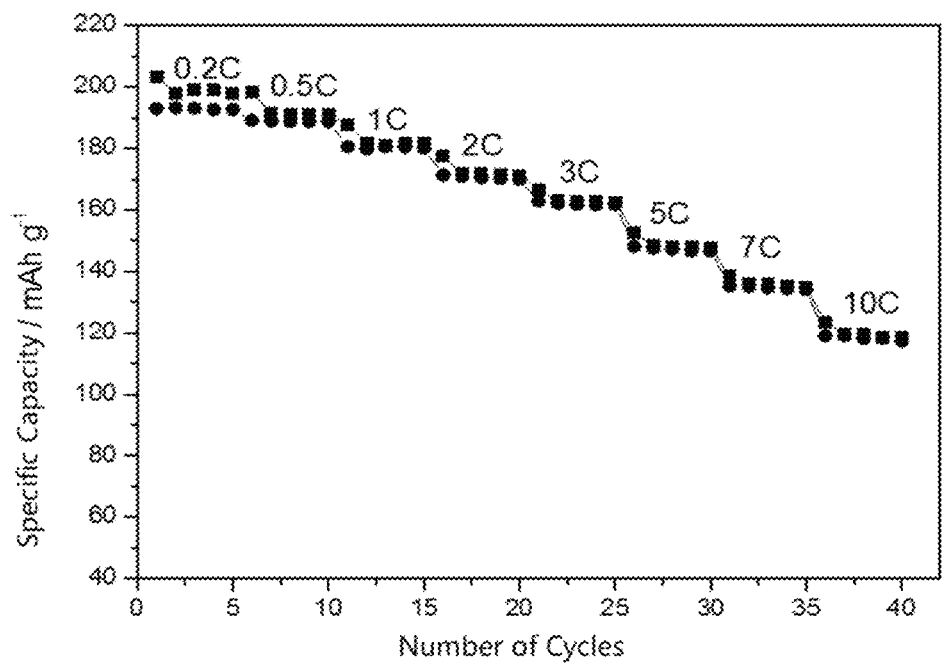
FIG. 7 shows the capacity results of a lithium battery assembled using the positive active material of Example 1 of the present application, measured at different rates.

The electrochemical property of the positive active material was evaluated as follows: 10 g of the positive active material was taken, 1.25 g of acetylene black and 12.5 g of polyvinylidene fluoride solution (solvent being N-methylpyrrolidone) with a mass fraction of 10% were added thereto and uniformly mixed, the resultant was applied and sliced to obtain a positive electrode piece; a lithium piece was used as the negative electrode, a liquid electrolyte consisted of a solute, a solvent and an additive was used as the electrolyte, in which the solute was $LiPF_6$ at a concentration of 1.2M, the solvent was a mixed solvent of EC, DEC and DMC at a volume ratio of 1:1:1, and the additive was VC at a concentration of 1.5 wt %; a commercially available cellgard 2325 diaphragm, USA, was used as the separator, and the above components were assembled in a glove box to form a lithium battery. The electrochemical property of the lithium battery was evaluated, the charge-discharge curve measured at a rate of 0.1 C is shown in FIG. 5, which shows that the material has a specific charge capacity of 224.6 mAh/g, a specific discharge capacity of 206.9 mAh/g, and a first-cycle efficiency of up to 92.1%. The cycling stability curve measured at a rate of 1 C is shown in FIG. 6, which shows that the material has a capacity retention of up to 96.1% after 80 cycles, and thus is excellent in cycling stability. The rate capability results are shown in FIG. 7, which shows that the material has a discharge capacity of up to about 120 mAh/g even at a high rate of 10 C.

The results of the discharge capacity, the first-cycle efficiency and the capacity retention after 80 cycles are shown in Table 3.

Example 2

This example was provided for illustrating the preparation and evaluation of the positive active material precursor and the positive active material according to the present application
(1) Preparation of Positive Active Material Precursor A metal salt solution with a metal ion concentration of 2 mol/L (wherein the molar ratio among nickel, cobalt and manganese elements was 18:1:1) was prepared; a NaOH solution with a concentration of 4 mol/L was prepared; and an aqueous ammonia solution with a concentration of 6 mol/L was prepared.

The prepared metal salt solution, NaOH solution and aqueous ammonia solution were added dropwise into a reaction kettle simultaneously under stirring to perform precipitation reaction. The dripping speed of the metal salt solution was 60 mL/h; the dripping speed of the ammonia solution was 60 mL/h, and the pH value of the reaction system was controlled to 11 by adjusting the dripping speed of the NaOH solution. After 6 hours of simultaneous dropwise addition of the three solutions, the feeding of the metal salt solution was suspended for 1 hour while keeping the feeding of the NaOH solution and the aqueous ammonia solution, and then the above process was repeated.

In the reaction process, the stirring speed was controlled to be 600 rpm, the reaction temperature was controlled to be 55° C., and the reaction time was controlled to be 48 h. The precipitation reaction was terminated after naturally cooling, the resulted slurry was subjected to vacuum filtration, washed with deionized water for 3 times, and then dried and dehydrated in a vacuum drying oven at 120° C. for 12 hours to obtain the positive active material precursor.

(2) Evaluation of Positive Active Material Precursor

The molar ratio of Ni to Co to Mn in the positive active material precursor obtained was 0.903:0.048:0.049. The positive active material precursor shows SEM images similar to FIGS. 1A and 1B, and an XRD pattern similar to FIG. 2, in which the intensity ratio of I(001)/I(100) is 2.37, the intensity ratio of I(001)/I(101) is 1.48, and the intensity ratio of I(101)/I(100) is 1.60.

(3) Preparation of Positive Active Material 10 g of the positive active material precursor was taken, a lithium source $LiOH \cdot H_2O$ was added thereto to ensure that the molar ratio of Li:(Ni+Co+Mn) was 1.02:1, the resultant was ball-milled for 2 h and uniformly mixed, then loaded into a crucible, and subjected to a multi-stage calcination at elevated temperature, wherein in the first stage: the temperature was raised from room temperature to 500° C. at a rate of 10° C./min, and kept for 4 h, and in the second stage: the temperature was raised from 500° C. to 750° C. at a rate of 10° C./min, and kept for 8 h, and then the resultant was allowed to cool naturally to obtain the positive active material.

(4) Evaluation of Positive Active Material

The positive active material shows SEM images similar to FIGS. 3A and 3B, and a TEM image similar to FIG. 3C.

The positive active material was evaluated for electrochemical properties in the same manner as in Example 1, and the results of the discharge capacity, first-cycle efficiency, and capacity retention after 80 cycles are shown in Table 3.

Example 3

This example was provided for illustrating the preparation and evaluation of the positive active material precursor and the positive active material according to the present application
(1) Preparation of Positive Active Material Precursor A metal salt solution with a metal ion concentration of 2 mol/L (wherein the molar ratio among nickel, cobalt and manganese elements was 3:1:1) was prepared; a NaOH solution with a concentration of 4 mol/L was prepared; and an aqueous ammonia solution with a concentration of 6 mol/L was prepared.

The prepared metal salt solution, NaOH solution and aqueous ammonia solution were added dropwise into a reaction kettle simultaneously under stirring to perform precipitation reaction. The dripping speed of the metal salt solution was 60 mL/h; the dripping speed of the ammonia solution was 60 mL/h, and the pH value of the reaction system was controlled to 11 by adjusting the dripping speed of the NaOH solution. After 6 hours of simultaneous dropwise addition of the three solutions, the feeding of the metal salt solution was suspended for 1 hour while keeping the feeding of the NaOH solution and the aqueous ammonia solution, and then the above process was repeated.

In the reaction process, the stirring speed was controlled to be 600 rpm, the reaction temperature was controlled to be 55° C., and the reaction time was controlled to be 48 h. The precipitation reaction was terminated after naturally cooling, the resulted slurry was subjected to vacuum filtration, washed with deionized water for 3 times, and then dried and dehydrated in a vacuum drying oven at 120° C. for 12 hours to obtain the positive active material precursor.

(2) Evaluation of Positive Active Material Precursor

The molar ratio of Ni to Co to Mn in the positive active material precursor obtained was 0.602:0.201:0.197. The positive active material precursor shows SEM images similar to FIGS. 1A and 1B, and an XRD pattern similar to FIG. 2, in which the intensity ratio of I(001)/I(100) was 1.59, the intensity ratio of I(001)/I(101) was 1.22, and the intensity ratio of I(101)/I(100) was 1.30.

(3) Preparation of Positive Active Material 10 g of the precursor was taken, a lithium source LiOH·H$_2$O was added thereto to ensure that the molar ratio of Li:(Ni+Co+Mn) was 1.02:1, the resultant was ball-milled for 2 h and uniformly mixed, then loaded into a crucible, and subjected to a multi-stage calcination at elevated temperature, wherein in the first stage: the temperature was raised from room temperature to 550° C. at a rate of 3° C./min, and kept for 8 h, and in the second stage: the temperature was raised from 550° C. to 900° C. at a rate of 3° C./min, and kept for 24 hours, and then the resultant was allowed to cool naturally to obtain the positive active material.

(4) Evaluation of Positive Active Material

The positive active material shows SEM images similar to FIGS. 3A and 3B, and a TEM image similar to FIG. 3C.

The positive active material was evaluated for electrochemical properties in the same manner as in Example 1, and the results of the discharge capacity, first-cycle efficiency, and capacity retention after 80 cycles are shown in Table 3.

Example 4

This example was provided for illustrating the preparation and evaluation of the positive active material precursor and the positive active material according to the present application (1) Preparation of Positive Active Material Precursor A metal salt solution with a metal ion concentration of 3 mol/L (wherein the molar ratio among nickel, cobalt and manganese elements was 8:1:1); a NaOH solution with a concentration of 8 mol/L was prepared; and an aqueous ammonia solution with a concentration of 10 mol/L was prepared.

The same procedure as described in Example 1 was carried out to obtain a positive active material precursor.

(2) Evaluation of Positive Active Material Precursor

The molar ratio of Ni to Co to Mn in the positive active material precursor obtained was 0.797:0.098:0.105. The positive active material precursor shows SEM images similar to FIGS. 1A and 1B, and an XRD pattern similar to FIG. 2, in which the intensity ratio of I(001)/I(100) was 1.98, the intensity ratio of I(001)/I(101) was 1.42, and the intensity ratio of I(101)/I(100) was 1.39.

(3) Preparation of Positive Active Material

The same procedure as described in Example 1 was carried out to obtain a positive active material.

(4) Evaluation of Positive Active Material

The positive active material shows SEM images similar to FIGS. 3A and 3B, and a TEM image similar to FIG. 3C.

The positive active material was evaluated for electrochemical properties in the same manner as in Example 1, and the results of the discharge capacity, first-cycle efficiency, and capacity retention after 80 cycles are shown in Table 3.

Example 5

This example was provided for illustrating the preparation and evaluation of the positive active material precursor and the positive active material according to the present application.

(1) Preparation of Positive Active Material Precursor

A metal salt solution with a metal ion concentration of 0.5 mol/L (wherein the molar ratio among nickel, cobalt and manganese elements was 8:1:1) was prepared; a NaOH solution with a concentration of 2 mol/L was prepared; and an aqueous ammonia solution with a concentration of 2 mol/L was prepared.

The same procedure as described in Example 1 was carried out to obtain a positive active material precursor.

(2) Evaluation of Positive Active Material Precursor

The molar ratio of Ni to Co to Mn in the positive active material precursor obtained was 0.802:0.101:0.097. The positive active material precursor shows SEM images similar to FIGS. 1A and 1B, and an XRD pattern similar to FIG. 2, in which the intensity ratio of I(001)/I(100) was 1.87, the intensity ratio of I(001)/I(101) was 1.39, and the intensity ratio of I(101)/I(100) was 1.35.

(3) Preparation of Positive Active Material

The same procedure as described in Example 1 was carried out to obtain a positive active material.

(4) Evaluation of Positive Active Material

The positive active material shows SEM images similar to FIGS. 3A and 3B, and a TEM image similar to FIG. 3C.

The positive active material was evaluated for electrochemical properties in the same manner as in Example 1, and the results of the discharge capacity, first-cycle efficiency, and capacity retention after 80 cycles are shown in Table 3.

Example 6

This example was provided for illustrating the preparation and evaluation of the positive active material precursor and the positive active material according to the present application (1) Preparation of Positive Active Material Precursor A metal salt solution with a metal ion concentration of 5 mol/L (wherein the molar ratio among nickel, cobalt and manganese elements was 8:1:1) was prepared; a NaOH solution with a concentration of 10 mol/L was prepared; and an aqueous ammonia solution with a concentration of 15 mol/L was prepared.

The same procedure as described in Example 1 was carried out to obtain a positive active material precursor.

(2) Evaluation of Positive Active Material Precursor

The molar ratio of Ni to Co to Mn in the positive active material precursor obtained was 0.801:0.099:0.100. The positive active material precursor shows SEM images similar to FIGS. 1A and 1B, and an XRD pattern similar to FIG. 2, in which the intensity ratio of I(001)/I(100) was 1.77, the intensity ratio of I(001)/I(101) was 1.33, and the intensity ratio of I(101)/I(100) was 1.33.

(3) Preparation of Positive Active Material

The same procedure as described in Example 1 was carried out to obtain a positive active material.

(4) Evaluation of Positive Active Material

The positive active material shows SEM images similar to FIGS. 3A and 3B, and a TEM image similar to FIG. 3C.

The positive active material was evaluated for electrochemical properties in the same manner as in Example 1, and the results of the discharge capacity, first-cycle efficiency, and capacity retention after 80 cycles are shown in Table 3.

Example 7

This example was provided for illustrating the preparation and evaluation of the positive active material precursor and the positive active material according to the present application (1) Preparation of Positive Active Material Precursor A metal salt solution with a metal ion concentration of 0.01 mol/L (wherein the molar ratio among nickel, cobalt and manganese elements was 8:1:1); a NaOH solution with a concentration of 0.02 mol/L was prepared; and an aqueous ammonia solution with a concentration of 0.01 mol/L was prepared.

The same procedure as described in Example 1 was carried out to obtain a positive active material precursor.

(2) Evaluation of Positive Active Material Precursor

The molar ratio of Ni to Co to Mn in the positive active material precursor obtained was 0.799:0.103:0.098. The positive active material precursor shows SEM images similar to FIGS. 1A and 1B, and an XRD pattern similar to FIG. 2, in which the intensity ratio of I(001)/I(100) was 1.71, the intensity ratio of I(001)/I(101) was 1.29, and the intensity ratio of I(101)/I(100) was 1.33.

(3) Preparation of Positive Active Material

The same procedure as described in Example 1 was carried out to obtain a positive active material.

(4) Evaluation of Positive Active Material

The positive active material shows SEM images similar to FIGS. 3A and 3B, and a TEM image similar to FIG. 3C.

The positive active material was evaluated for electrochemical properties in the same manner as in Example 1, and the results of the discharge capacity, first-cycle efficiency, and capacity retention after 80 cycles are shown in Table 3.

Example 8

This example was provided for illustrating the preparation and evaluation of the positive active material precursor and the positive active material according to the present application (1) Preparation of Positive Active Material Precursor The same procedure as described in Example 1 was carried out, except that the pH of the system was controlled to 12 by adjusting the dripping speed of the NaOH solution during the dripping process, to obtain a positive active material precursor.

(2) Evaluation of Positive Active Material Precursor

The molar ratio of Ni to Co to Mn in the positive active material precursor obtained was 0.797:0.102:0.101. The positive active material precursor shows SEM images similar to FIGS. 1A and 1B, and an XRD pattern similar to FIG. 2, in which the intensity ratio of I(001)/I(100) was 1.65, the intensity ratio of I(001)/I(101) was 1.25, and the intensity ratio of I(101)/I(100) was 1.32.

(3) Preparation of Positive Active Material

The same procedure as described in Example 1 was carried out to obtain a positive active material.

(4) Evaluation of Positive Active Material

The positive active material shows SEM images similar to FIGS. 3A and 3B, and a TEM image similar to FIG. 3C.

The positive active material was evaluated for electrochemical properties in the same manner as in Example 1, and the results of the discharge capacity, first-cycle efficiency, and capacity retention after 80 cycles are shown in Table 3.

Example 9

This example was provided for illustrating the preparation and evaluation of the positive active material precursor and the positive active material according to the present application (1) Preparation of Positive Active Material Precursor The same procedure as described in Example 1 was carried out, except that the pH of the system was controlled to 9 by adjusting the dripping speed of the NaOH solution during the dripping process, to obtain a positive active material precursor.

(2) Evaluation of Positive Active Material Precursor

The molar ratio of Ni to Co to Mn in the positive active material precursor obtained was 0.791:0.105:0.104. The positive active material precursor shows SEM images similar to FIGS. 1A and 1B, and an XRD pattern similar to FIG. 2, in which the intensity ratio of I(001)/I(100) was 1.68, the intensity ratio of I(001)/I(101) was 1.26, and the intensity ratio of I(101)/I(100) was 1.33.

(3) Preparation of Positive Active Material

The same procedure as described in Example 1 was carried out to obtain a positive active material.

(4) Evaluation of Positive Active Material

The positive active material shows SEM images similar to FIGS. 3A and 3B, and a TEM image similar to FIG. 3C.

The positive active material was evaluated for electrochemical properties in the same manner as in Example 1, and the results of the discharge capacity, first-cycle efficiency, and capacity retention after 80 cycles are shown in Table 3.

Example 10

This example was provided for illustrating the preparation and evaluation of the positive active material precursor and the positive active material according to the present application (1) Preparation of Positive Active Material Precursor The same procedure as described in Example 1 was carried out, except that the reaction temperature was controlled to 70° C. during the dripping process, to obtain a positive active material precursor.

(2) Evaluation of Positive Active Material Precursor

The molar ratio of Ni to Co to Mn in the positive active material precursor obtained was 0.800:0.098:0.102. The positive active material precursor shows SEM images similar to FIGS. 1A and 1B, and an XRD pattern similar to FIG. 2, in which the intensity ratio of I(001)/I(100) was 1.86, the intensity ratio of I(001)/I(101) was 1.38, and the intensity ratio of I(101)/I(100) was 1.35.

(3) Preparation of Positive Active Material

The same procedure as described in Example 1 was carried out to obtain a positive active material.

(4) Evaluation of Positive Active Material

The positive active material shows SEM images similar to FIGS. 3A and 3B, and a TEM image similar to FIG. 3C.

The positive active material was evaluated for electrochemical properties in the same manner as in Example 1, and the results of the discharge capacity, first-cycle efficiency, and capacity retention after 80 cycles are shown in Table 3.

Example 11

This example was provided for illustrating the preparation and evaluation of the positive active material precursor and the positive active material according to the present application
(1) Preparation of Positive Active Material Precursor The same procedure as described in Example 1 was carried out, except that the reaction temperature was controlled to 30° C. during the dripping process, to obtain a positive active material precursor.
(2) Evaluation of Positive Active Material Precursor The molar ratio of Ni to Co to Mn in the positive active material precursor obtained was 0.805:0.102:0.093. The positive active material precursor shows SEM images similar to FIGS. 1A and 1B, and an XRD pattern similar to FIG. 2, in which the intensity ratio of $I(001)/I(100)$ was 2.02, the intensity ratio of $I(001)/I(101)$ was 1.44, and the intensity ratio of $I(101)/I(100)$ was 1.40.
(3) Preparation of Positive Active Material The same procedure as described in Example 1 was carried out to obtain a positive active material.
(4) Evaluation of Positive Active Material The positive active material shows SEM images similar to FIGS. 3A and 3B, and a TEM image similar to FIG. 3C.

The positive active material was evaluated for electrochemical properties in the same manner as in Example 1, and the results of the discharge capacity, first-cycle efficiency, and capacity retention after 80 cycles are shown in Table 3.

Example 12

This example was provided for illustrating the preparation and evaluation of the positive active material precursor and the positive active material according to the present application
(1) Preparation of Positive Active Material Precursor The same procedure as described in Example 1 was carried out, except that the reaction time was 12 hours, to obtain a positive active material precursor.
(2) Evaluation of Positive Active Material Precursor The molar ratio of Ni to Co to Mn in the positive active material precursor obtained was 0.792:0.104:0.104. The positive active material precursor shows SEM images similar to FIGS. 1A and 1B, and an XRD pattern similar to FIG. 2, in which the intensity ratio of $I(001)/I(100)$ was 1.81, the intensity ratio of $I(001)/I(101)$ was 1.38, and the intensity ratio of $I(101)/I(100)$ was 1.31.
(3) Preparation of Positive Active Material The same procedure as described in Example 1 was carried out to obtain a positive active material.
(4) Evaluation of Positive Active Material The positive active material shows SEM images similar to FIGS. 3A and 3B, and a TEM image similar to FIG. 3C.

The positive active material was evaluated for electrochemical properties in the same manner as in Example 1, and the results of the discharge capacity, first-cycle efficiency, and capacity retention after 80 cycles are shown in Table 3.

Example 13

This example was provided for illustrating the preparation and evaluation of the positive active material precursor and the positive active material according to the present application
(1) Preparation of Positive Active Material Precursor The same procedure as described in Example 1 was carried out, except that the stirring speed was 50 r/min, to obtain a positive active material precursor.
(2) Evaluation of Positive Active Material Precursor The molar ratio of Ni to Co to Mn in the positive active material precursor obtained was 0.789:0.108:0.103. The positive active material precursor shows SEM images similar to FIGS. 1A and 1B, and an XRD pattern similar to FIG. 2, in which the intensity ratio of $I(001)/I(100)$ was 1.62, the intensity ratio of $I(001)/I(101)$ was 1.24, and the intensity ratio of $I(101)/I(100)$ was 1.31.
(3) Preparation of Positive Active Material The same procedure as described in Example 1 was carried out to obtain a positive active material.
(4) Evaluation of Positive Active Material The positive active material shows SEM images similar to FIGS. 3A and 3B, and a TEM image similar to FIG. 3C.

The positive active material was evaluated for electrochemical properties in the same manner as in Example 1, and the results of the discharge capacity, first-cycle efficiency, and capacity retention after 80 cycles are shown in Table 3.

Example 14

This example was provided for illustrating the preparation and evaluation of the positive active material precursor and the positive active material according to the present application
(1) Preparation of Positive Active Material Precursor The same procedure as described in Example 1 was carried out, except that the stirring speed was 1000 r/min, to obtain a positive active material precursor.
(2) Evaluation of Positive Active Material Precursor The molar ratio of Ni to Co to Mn in the positive active material precursor obtained was 0.800:0.100:0.100. The positive active material precursor shows SEM images similar to FIGS. 1A and 1B, and an XRD pattern similar to FIG. 2, in which the intensity ratio of $I(001)/I(100)$ was 2.41, the intensity ratio of $I(001)/I(101)$ was 1.51, and the intensity ratio of $I(101)/I(100)$ was 1.60.
(3) Preparation of Positive Active Material The same procedure as described in Example 1 was carried out to obtain a positive active material.
(4) Evaluation of Positive Active Material The positive active material shows SEM images similar to FIGS. 3A and 3B, and a TEM image similar to FIG. 3C.

The positive active material was evaluated for electrochemical properties in the same manner as in Example 1, and the results of the discharge capacity, first-cycle efficiency, and capacity retention after 80 cycles are shown in Table 3.

Example 15

This example is provided for illustrating the preparation and evaluation of the positive active material according to the present application (1) Preparation of Positive Active Material The same procedure as described in Example 1 was carried out, except that, in the first stage of the multi-stage calcination: the temperature was raised from room temperature to 600° C. at a rate of 5° C./min, and kept for 1 h, and in the second stage: the temperature was raised from 600° C. to 750° C. at a rate of 5° C./min, and kept for 48 h, to obtain a positive active material.

(2) Evaluation of Positive Active Material

The positive active material shows SEM images similar to FIGS. 3A and 3B, and a TEM image similar to FIG. 3C.

The positive active material was evaluated for electrochemical properties in the same manner as in Example 1, and the results of the discharge capacity, first-cycle efficiency, and capacity retention after 80 cycles are shown in Table 3.

Example 16

This example is provided for illustrating the preparation and evaluation of the positive active material according to the present application (1) Preparation of Positive Active Material The same procedure as described in Example 1 was carried out, except that, in the first stage of the multi-stage calcination: the temperature was raised from room temperature to 300° C. at a rate of 5° C./min, and kept for 10 h, and in the second stage: the temperature was raised from 300° C. to 1000° C. at a rate of 5° C./min, and kept for 4 h, to obtain a positive active material.

(2) Evaluation of Positive Active Material

The positive active material shows SEM images similar to FIGS. 3A and 3B, and a TEM image similar to FIG. 3C.

The positive active material was evaluated for electrochemical properties in the same manner as in Example 1, and the results of the discharge capacity, first-cycle efficiency, and capacity retention after 80 cycles are shown in Table 3.

Example 17

This example is provided for illustrating the preparation and evaluation of the positive active material according to the present application (1) Preparation of Positive Active Material The same procedure as described in Example 1 was carried out, except that a single stage calcination is performed, in which the temperature was raised from room temperature to 850° C. at a rate of 5° C./min and kept for 12 h, to obtain a positive active material.

(2) Evaluation of Positive Active Material

The positive active material shows SEM images similar to FIGS. 3A and 3B, and a TEM image similar to FIG. 3C.

The positive active material was evaluated for electrochemical properties in the same manner as in Example 1, and the results of the discharge capacity, first-cycle efficiency, and capacity retention after 80 cycles are shown in Table 3.

Example 18

This example was provided for illustrating the preparation and evaluation of the positive active material precursor and the positive active material according to the present application (1) Preparation of Positive Active Material Precursor The same procedure as described in Example 1 was carried out, except that a KOH solution of the same concentration was used as the precipitant, to obtain a positive active material precursor.

(2) Evaluation of Positive Active Material Precursor

The molar ratio of Ni to Co to Mn in the positive active material precursor obtained was 0.799:0.101:0.100. The positive active material precursor shows SEM images similar to FIGS. 1A and 1B, and an XRD pattern similar to FIG. 2, in which the intensity ratio of I(001)/I(100) was 2.43, the intensity ratio of I(001)/I(101) was 1.51, and the intensity ratio of I(101)/I(100) was 1.61.

(3) Preparation of Positive Active Material

The same procedure as described in Example 1 was carried out to obtain a positive active material.

(4) Evaluation of Positive Active Material

The positive active material shows SEM images similar to FIGS. 3A and 3B, and a TEM image similar to FIG. 3C.

The positive active material was evaluated for electrochemical properties in the same manner as in Example 1, and the results of the discharge capacity, first-cycle efficiency, and capacity retention after 80 cycles are shown in Table 3.

Example 19

This example was provided for illustrating the preparation and evaluation of the positive active material precursor and the positive active material according to the present application (1) Preparation of Positive Active Material Precursor The same procedure as described in Example 1 was carried out, except that a diethanolamine solution of the same concentration was used as the complexing agent, to obtain a positive active material precursor.

(2) Evaluation of Positive Active Material Precursor

The molar ratio of Ni to Co to Mn in the positive active material precursor obtained was 0.792:0.105:0.103. The positive active material precursor shows SEM images similar to FIGS. 1A and 1B, and an XRD pattern similar to FIG. 2, in which the intensity ratio of I(001)/I(100) was 2.42, the intensity ratio of I(001)/I(101) was 1.58, and the intensity ratio of I(101)/I(100) was 1.53.

(3) Preparation of Positive Active Material

The same procedure as described in Example 1 was carried out to obtain a positive active material.

(4) Evaluation of Positive Active Material

The positive active material shows SEM images similar to FIGS. 3A and 3B, and a TEM image similar to FIG. 3C.

The positive active material was evaluated for electrochemical properties in the same manner as in Example 1, and the results of the discharge capacity, first-cycle efficiency, and capacity retention after 80 cycles are shown in Table 3.

Example 20

This example was provided for illustrating the preparation and evaluation of the positive active material precursor and the positive active material according to the present application (1) Preparation of Positive Active Material Precursor The same procedure as described in Example 1 was carried out, except that a disodium ethylenediaminetetraacetate solution of the same concentration was used as the complexing agent, to obtain a positive active material precursor.

(2) Evaluation of Positive Active Material Precursor

The molar ratio of Ni to Co to Mn in the positive active material precursor obtained was 0.805:0.097:0.098. The positive active material precursor shows SEM images similar to FIGS. 1A and 1B, and an XRD pattern similar to FIG. 2, in which the intensity ratio of I(001)/I(100) was 2.43, the intensity ratio of I(001)/I(101) was 1.55, and the intensity ratio of I(101)/I(100) was 1.57.

(3) Preparation of Positive Active Material

The same procedure as described in Example 1 was carried out to obtain a positive active material.

(4) Evaluation of Positive Active Material

The positive active material shows SEM images similar to FIGS. 3A and 3B, and a TEM image similar to FIG. 3C.

The positive active material was evaluated for electrochemical properties in the same manner as in Example 1, and the results of the discharge capacity, first-cycle efficiency, and capacity retention after 80 cycles are shown in Table 3.

Example 21

This example was provided for illustrating the preparation and evaluation of the positive active material precursor and the positive active material according to the present application (1) Preparation of Positive Active Material Precursor The same procedure as described in Example 1 was carried out, except that a sodium citrate solution of the same concentration was used as the complexing agent, to obtain a positive active material precursor.

(2) Evaluation of Positive Active Material Precursor

The molar ratio of Ni to Co to Mn in the positive active material precursor obtained was 0.800:0.102:0.098. The positive active material precursor shows SEM images similar to FIGS. 1A and 1B, and an XRD pattern similar to FIG. 2, in which the intensity ratio of I(001)/I(100) was 2.43, the intensity ratio of I(001)/I(101) was 1.54, and the intensity ratio of I(101)/I(100) was 1.58.

(3) Preparation of Positive Active Material

The same procedure as described in Example 1 was carried out to obtain a positive active material.

(4) Evaluation of Positive Active Material

The positive active material shows SEM images similar to FIGS. 3A and 3B, and a TEM image similar to FIG. 3C.

The positive active material was evaluated for electrochemical properties in the same manner as in Example 1, and the results of the discharge capacity, first-cycle efficiency, and capacity retention after 80 cycles are shown in Table 3.

Example 22

This example was provided for illustrating the preparation and evaluation of the positive active material precursor and the positive active material according to the present application (1) Preparation of Positive Active Material Precursor The same procedure as described in Example 1 was carried out, except that the metal salt solution was a 2 mol/L solution comprising nickel, cobalt and aluminum at a molar ratio of 8:1.5:0.5, to obtain a positive active material precursor.

(2) Evaluation of Positive Active Material Precursor

The molar ratio of Ni to Co to Al in the positive active material precursor obtained was 0.802:0.153:0.045. The positive active material precursor shows SEM images similar to FIGS. 1A and 1B, and an XRD pattern similar to FIG. 2, in which the intensity ratio of I(001)/I(100) was 2.44, the intensity ratio of I(001)/I(101) was 1.53, and the intensity ratio of I(101)/I(100) was 1.59.

(3) Preparation of Positive Active Material

The same procedure as described in Example 1 was carried out to obtain a positive active material.

(4) Evaluation of Positive Active Material

The positive active material shows SEM images similar to FIGS. 3A and 3B, and a TEM image similar to FIG. 3C.

The positive active material was evaluated for electrochemical properties in the same manner as in Example 1, and the results of the discharge capacity, first-cycle efficiency, and capacity retention after 80 cycles are shown in Table 3.

Example 23

This example was provided for illustrating the preparation and evaluation of the positive active material precursor and the positive active material according to the present application (1) Preparation of Positive Active Material Precursor The same procedure as described in Example 1 was carried out, except that the metal salt solution was a 2 mol/L solution comprising nickel, cobalt and magnesium at a molar ratio of 8:1:1, to obtain a positive active material precursor.

(2) Evaluation of Positive Active Material Precursor

The molar ratio of Ni, Co and Mg in the positive active material precursor obtained was 0.801:0.102:0.097. The positive active material precursor shows SEM images similar to FIGS. 1A and 1B, and an XRD pattern similar to FIG. 2, in which the intensity ratio of I(001)/I(100) was 2.44, the intensity ratio of I(001)/I(101) was 1.55, and the intensity ratio of I(101)/I(100) was 1.57.

(3) Preparation of Positive Active Material

The same procedure as described in Example 1 was carried out to obtain a positive active material.

(4) Evaluation of Positive Active Material

The positive active material shows SEM images similar to FIGS. 3A and 3B, and a TEM image similar to FIG. 3C.

The positive active material was evaluated for electrochemical properties in the same manner as in Example 1, and the results of the discharge capacity, first-cycle efficiency, and capacity retention after 80 cycles are shown in Table 3.

Example 24

This example was provided for illustrating the preparation and evaluation of the positive active material precursor and the positive active material according to the present application (1) Preparation of Positive Active Material Precursor The same procedure as described in Example 1 was carried out, except that 0.02 mol/L of $TiSO_4$ was additionally added to the metal salt solution, to obtain a positive active material precursor.

(2) Evaluation of Positive Active Material Precursor

The molar ratio of Ni to Co to Mn to Ti in the positive active material precursor obtained was 0.795:0.101:0.104:0.009. The positive active material precursor shows SEM images similar to FIGS. 1A and 1B, and an XRD pattern similar to FIG. 2, in which the intensity ratio of I(001)/I(100) was 2.32, the intensity ratio of I(001)/I(101) was 1.49, and the intensity ratio of I(101)/I(100) was 1.56.

(3) Preparation of Positive Active Material

The same procedure as described in Example 1 was carried out to obtain a positive active material.

(4) Evaluation of Positive Active Material

The positive active material shows SEM images similar to FIGS. 3A and 3B, and a TEM image similar to FIG. 3C.

The positive active material was evaluated for electrochemical properties in the same manner as in Example 1, and the results of the discharge capacity, first-cycle efficiency, and capacity retention after 80 cycles are shown in Table 3.

Example 25

This example was provided for illustrating the preparation and evaluation of the positive active material precursor and the positive active material according to the present application (1) Preparation of Positive Active Material Precursor The same procedure as described in Example 1 was carried out, except that 0.01 mol/L of $Cr_2(SO_4)_3$ was additionally added to the metal salt solution, to obtain a positive active material precursor.

(2) Evaluation of Positive Active Material Precursor

The molar ratio of Ni to Co to Mn to Cr in the positive active material precursor obtained was 0.798:0.103:0.099:0.011. The positive active material precursor shows SEM images similar to FIGS. 1A and 1B, and an XRD pattern similar to FIG. 2, in which the intensity ratio of I(001)/I(100) was 2.29, the intensity ratio of I(001)/I(101) was 1.47, and the intensity ratio of I(101)/I(100) was 1.56.

(3) Preparation of Positive Active Material

The same procedure as described in Example 1 was carried out to obtain a positive active material.

(4) Evaluation of Positive Active Material

The positive active material shows SEM images similar to FIGS. 3A and 3B, and a TEM image similar to FIG. 3C.

The positive active material was evaluated for electrochemical properties in the same manner as in Example 1, and the results of the discharge capacity, first-cycle efficiency, and capacity retention after 80 cycles are shown in Table 3.

Example 26

This example was provided for illustrating the preparation and evaluation of the positive active material precursor and the positive active material according to the present application (1) Preparation of Positive Active Material Precursor The same procedure as described in Example 1 was carried out, except that 0.02 mol/L of $Fe(NO_3)_3 \cdot 9H_2O$ was additionally added to the metal salt solution, to obtain a positive active material precursor.

(2) Evaluation of Positive Active Material Precursor

The molar ratio of Ni to Co to Mn to Fe in the positive active material precursor obtained was 0.803:0.096:0.101:0.010. The positive active material precursor shows SEM images similar to FIGS. 1A and 1B, and an XRD pattern similar to FIG. 2, in which the intensity ratio of I(001)/I(100) was 2.26, the intensity ratio of I(001)/I(101) was 1.47, and the intensity ratio of I(101)/I(100) was 1.54.

(3) Preparation of Positive Active Material

The same procedure as described in Example 1 was carried out to obtain a positive active material.

(4) Evaluation of Positive Active Material

The positive active material shows SEM images similar to FIGS. 3A and 3B, and a TEM image similar to FIG. 3C.

The positive active material was evaluated for electrochemical properties in the same manner as in Example 1, and the results of the discharge capacity, first-cycle efficiency, and capacity retention after 80 cycles are shown in Table 3.

Example 27

This example was provided for illustrating the preparation and evaluation of the positive active material precursor and the positive active material according to the present application (1) Preparation of Positive Active Material Precursor The same procedure as described in Example 1 was carried out, except that 0.02 mol/L of $CuSO_4 \cdot 5H_2O$ was additionally added to the metal salt solution, to obtain a positive active material precursor.

(2) Evaluation of Positive Active Material Precursor

The molar ratio of Ni to Co to Mn to Cu in the positive active material precursor obtained was 0.801:0.100:0.099:0.009. The positive active material precursor shows SEM images similar to FIGS. 1A and 1B, and an XRD pattern similar to FIG. 2, in which the intensity ratio of I(001)/I(100) was 2.09, the intensity ratio of I(001)/I(101) was 1.45, and the intensity ratio of I(101)/I(100) was 1.44.

(3) Preparation of Positive Active Material

The same procedure as described in Example 1 was carried out to obtain a positive active material.

(4) Evaluation of Positive Active Material

The positive active material shows SEM images similar to FIGS. 3A and 3B, and a TEM image similar to FIG. 3C.

The positive active material was evaluated for electrochemical properties in the same manner as in Example 1, and the results of the discharge capacity, first-cycle efficiency, and capacity retention after 80 cycles are shown in Table 3.

Example 28

This example was provided for illustrating the preparation and evaluation of the positive active material precursor and the positive active material according to the present application (1) Preparation of Positive Active Material Precursor The same procedure as described in Example 1 was carried out, except that 0.02 mol/L of $ZnSO_4 \cdot H_2O$ was additionally added to the metal salt solution, to obtain a positive active material precursor.

(2) Evaluation of Positive Active Material Precursor

The molar ratio of Ni to Co to Mn to Zn in the positive active material precursor obtained was 0.797:0.104:0.099:0.010. The positive active material precursor shows SEM images similar to FIGS. 1A and 1B, and an XRD pattern similar to FIG. 2, in which the intensity ratio of I(001)/I(100) was 2.13, the intensity ratio of I(001)/I(101) was 1.46, and the intensity ratio of I(101)/I(100) was 1.46.

(3) Preparation of Positive Active Material

The same procedure as described in Example 1 was carried out to obtain a positive active material.

(4) Evaluation of Positive Active Material

The positive active material shows SEM images similar to FIGS. 3A and 3B, and a TEM image similar to FIG. 3C.

The positive active material was evaluated for electrochemical properties in the same manner as in Example 1, and the results of the discharge capacity, first-cycle efficiency, and capacity retention after 80 cycles are shown in Table 3.

Comparative Example 1

This comparative example was provided for illustrating the preparation and evaluation of the positive active material precursor and the positive active material not according to the present application
(1) Preparation of Positive Active Material Precursor The same procedure as described in Example 1 was carried out, except that the dripping process was a continuous dripping process of the metal solution, the precipitant solution, and the complexing agent solution, and there was no intermittent dripping process of the metal solution, to obtain a positive active material precursor.

(2) Evaluation of Positive Active Material Precursor

Figure 8:
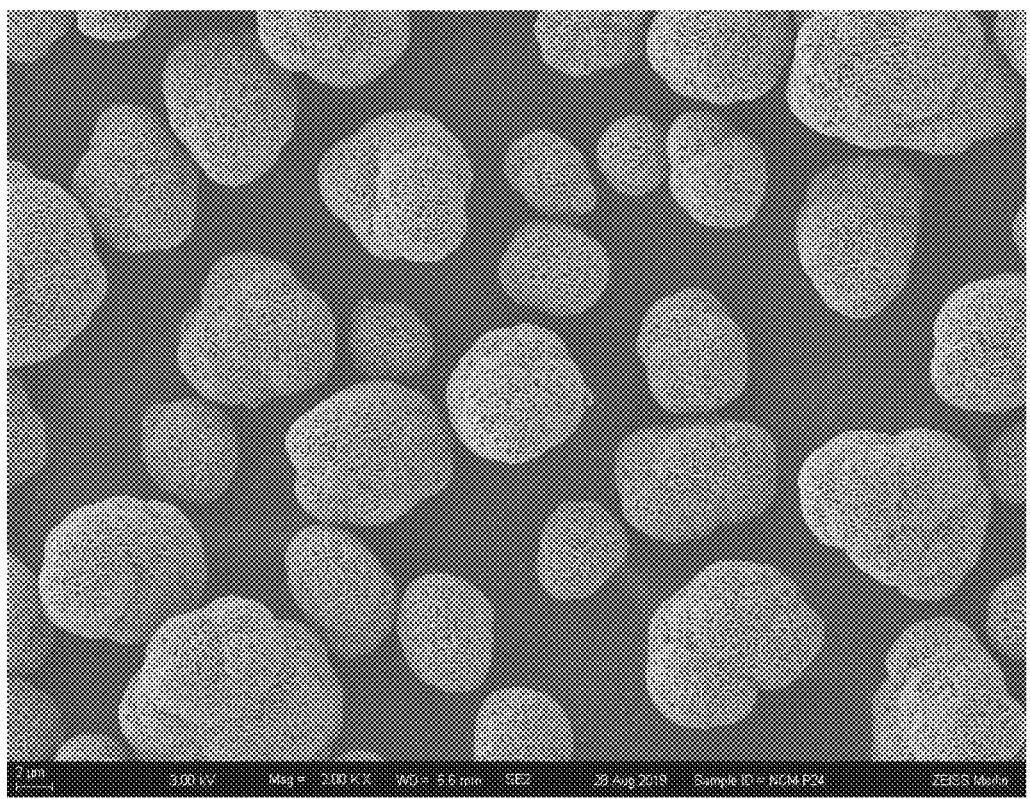
FIG. 8 is an SEM image of the positive active material precursor obtained in Comparative Example 1 of the present application.

The molar ratio of Ni to Co to Mn in the positive active material precursor obtained was 0.799:0.102:0.099. The SEM image of the positive active material precursor obtained is shown in FIG. 8, and it can be seen that the morphology of the positive active material precursor is spherical polycrystal aggregate with a good sphericity.

Figure 9:
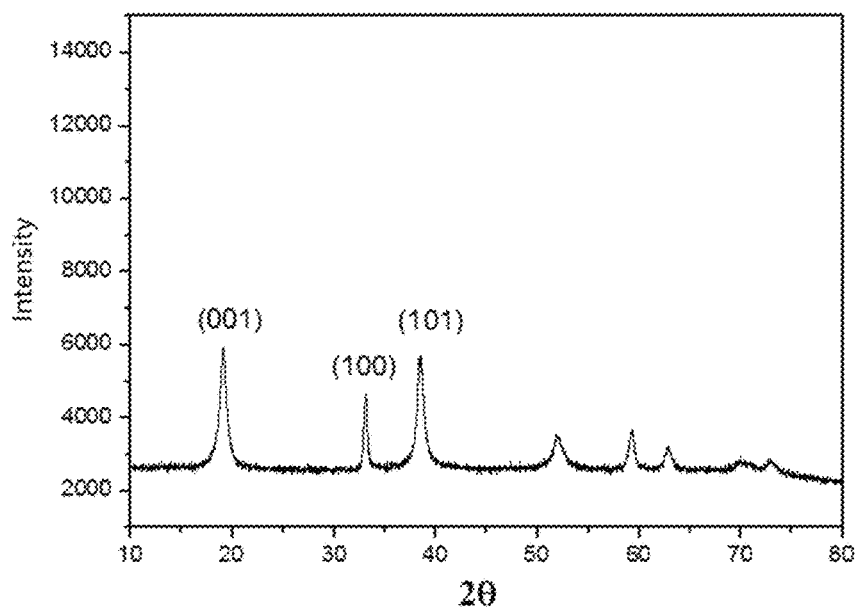
FIG. 9 shows an XRD pattern of the positive active material precursor obtained in Comparative Example 1 of the present application.
Figure 10A:
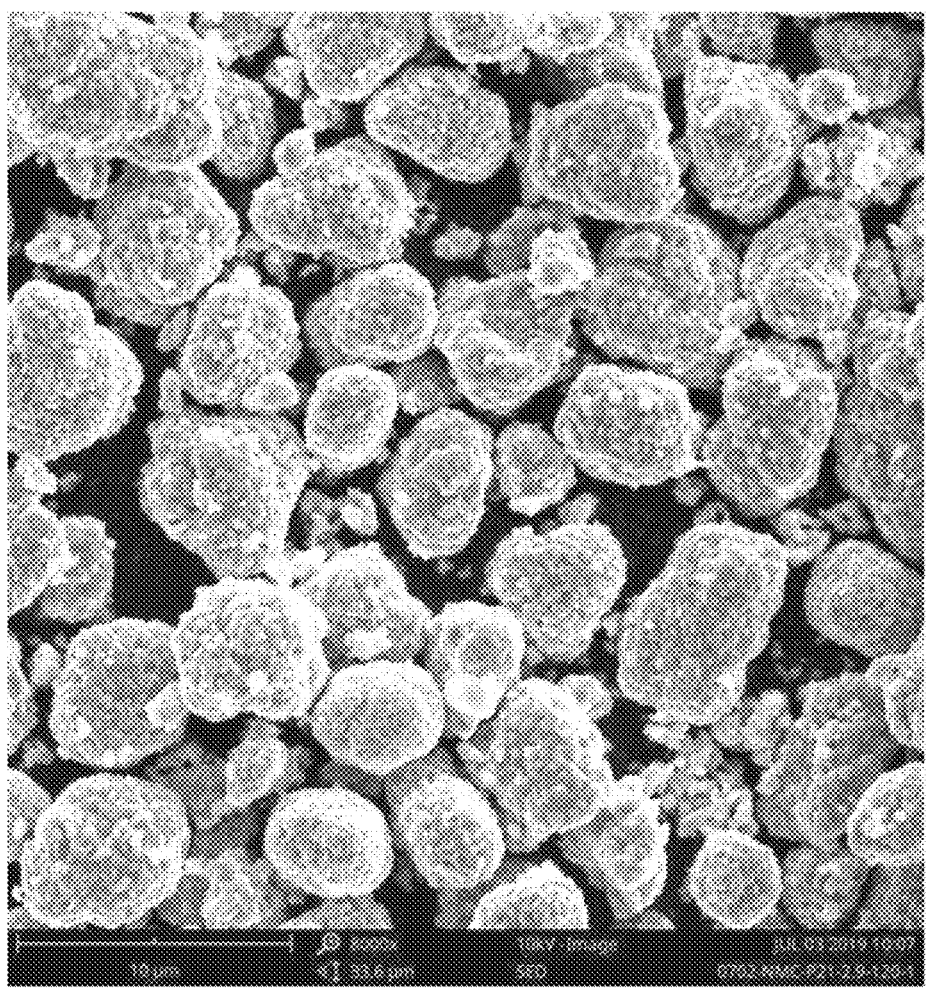
FIG. 10A is an SEM image of the positive active material obtained in Comparative Example 1 of the present application.

The XRD pattern was shown in FIG. 9, and it can be seen that the difference between the (001) crystal face, the (100) crystal face and the (101) crystal face is small, the intensity ratio of I(001)/I(100) is 1.19, the intensity ratio of I(001)/I(101) is 1.04, and the intensity ratio of I(101)/I(100) is 1.14.
(3) Preparation of Positive Active Material The same procedure as described in Example 1 was carried out to obtain a positive active material.
(4) Evaluation of Positive Active Material The SEM image of the positive active material is shown in FIG. 10A, and it can be seen that the morphology of the positive active material obtained is secondary micrometer spherical polycrystal aggregates with good sphericity, that are formed by nanometer or submicron primary particles.

Figure 10B:
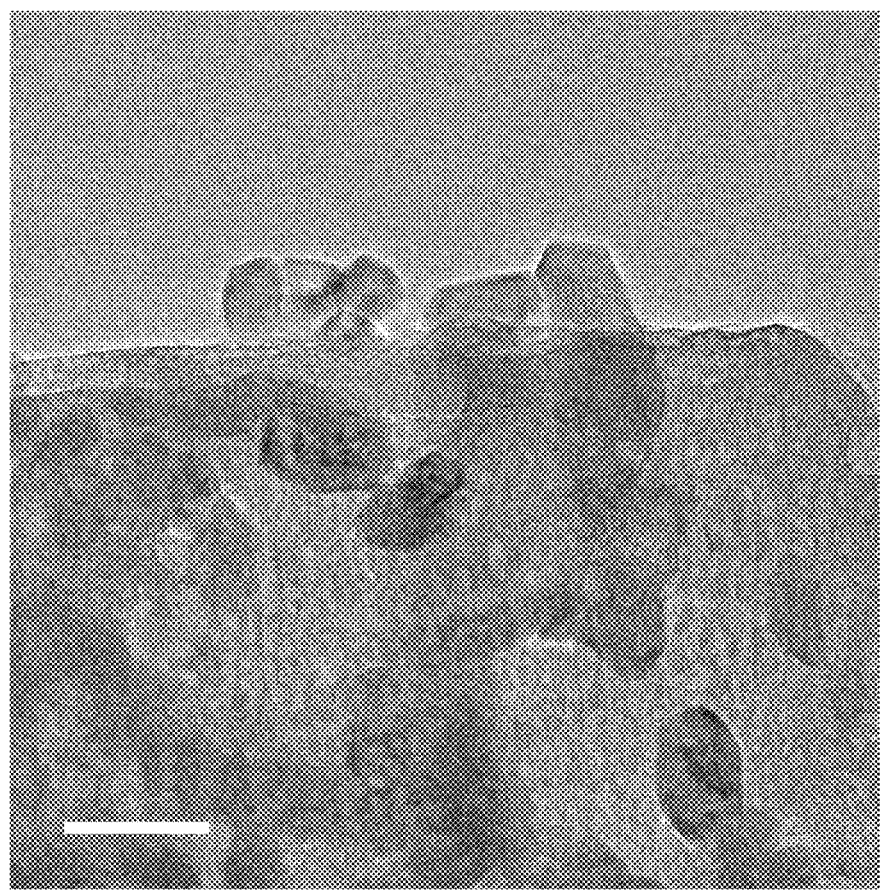
FIG. 10B is a TEM image of the positive active material obtained in Comparative Example 1 of the present application.

The TEM image of the positive active material is shown in FIG. 10B, and it is apparent from FIG. 10B that after the ultrasonic treatment during the sample preparation process, the secondary micrometer spherical polycrystal aggregates of the positive active material were partially disintegrated, resulting in discrete individual nanoparticles.

Figure 11:
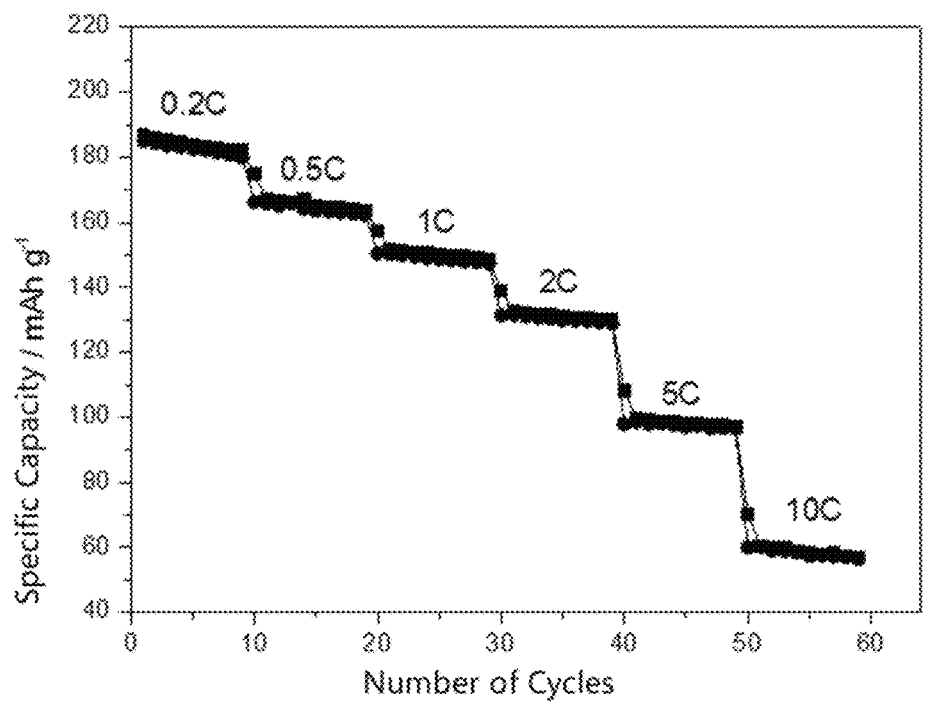
FIG. 11 shows the capacity results of a lithium battery assembled using the positive active material of Comparative Example 1 of the present application, measured at different rates.

The positive active material was evaluated for electrochemical properties in the same manner as in Example 1, and the results of the discharge capacity, first-cycle efficiency, and capacity retention after 80 cycles are shown in Table 3, and the rate capability results are shown in FIG. 11.

TABLE 1

Metal element composition of positive active material precursors and positive active materials obtained in Examples 1-28 and Comparative Example 1

| No. | Positive active material precursor | Positive active material |
|---|---|---|
| Example 1 | $Ni_{0.799}Co_{0.100}Mn_{0.101}$ | $Li_{1.010}Ni_{0.799}Co_{0.100}Mn_{0.101}$ |
| Example 2 | $Ni_{0.903}Co_{0.048}Mn_{0.049}$ | $Li_{1.011}Ni_{0.903}Co_{0.048}Mn_{0.049}$ |
| Example 3 | $Ni_{0.602}Co_{0.201}Mn_{0.197}$ | $Li_{1.005}Ni_{0.602}Co_{0.201}Mn_{0.197}$ |
| Example 4 | $Ni_{0.797}Co_{0.098}Mn_{0.105}$ | $Li_{1.007}Ni_{0.797}Co_{0.098}Mn_{0.105}$ |
| Example 5 | $Ni_{0.802}Co_{0.101}Mn_{0.097}$ | $Li_{1.008}Ni_{0.802}Co_{0.101}Mn_{0.097}$ |
| Example 6 | $Ni_{0.801}Co_{0.099}Mn_{0.100}$ | $Li_{1.006}Ni_{0.801}Co_{0.099}Mn_{0.100}$ |
| Example 7 | $Ni_{0.799}Co_{0.103}Mn_{0.098}$ | $Li_{1.011}Ni_{0.799}Co_{0.103}Mn_{0.098}$ |
| Example 8 | $Ni_{0.797}Co_{0.102}Mn_{0.101}$ | $Li_{1.009}Ni_{0.797}Co_{0.102}Mn_{0.101}$ |
| Example 9 | $Ni_{0.791}Co_{0.105}Mn_{0.104}$ | $Li_{1.002}Ni_{0.791}Co_{0.105}Mn_{0.104}$ |
| Example 10 | $Ni_{0.800}Co_{0.098}Mn_{0.102}$ | $Li_{1.008}Ni_{0.800}Co_{0.098}Mn_{0.102}$ |
| Example 11 | $Ni_{0.805}Co_{0.102}Mn_{0.093}$ | $Li_{1.005}Ni_{0.805}Co_{0.102}Mn_{0.093}$ |
| Example 12 | $Ni_{0.792}Co_{0.104}Mn_{0.104}$ | $Li_{1.004}Ni_{0.792}Co_{0.104}Mn_{0.104}$ |
| Example 13 | $Ni_{0.789}Co_{0.108}Mn_{0.103}$ | $Li_{1.003}Ni_{0.789}Co_{0.108}Mn_{0.103}$ |
| Example 14 | $Ni_{0.800}Co_{0.100}Mn_{0.100}$ | $Li_{1.010}Ni_{0.800}Co_{0.100}Mn_{0.100}$ |
| Example 15 | $Ni_{0.799}Co_{0.100}Mn_{0.101}$ | $Li_{1.013}Ni_{0.799}Co_{0.100}Mn_{0.101}$ |
| Example 16 | $Ni_{0.799}Co_{0.100}Mn_{0.101}$ | $Li_{0.997}Ni_{0.799}Co_{0.100}Mn_{0.101}$ |
| Example 17 | $Ni_{0.799}Co_{0.100}Mn_{0.101}$ | $Li_{1.016}Ni_{0.799}Co_{0.100}Mn_{0.101}$ |
| Example 18 | $Ni_{0.799}Co_{0.101}Mn_{0.100}$ | $Li_{1.007}Ni_{0.799}Co_{0.101}Mn_{0.100}$ |
| Example 19 | $Ni_{0.792}Co_{0.105}Mn_{0.103}$ | $Li_{1.003}Ni_{0.792}Co_{0.105}Mn_{0.103}$ |
| Example 20 | $Ni_{0.805}Co_{0.097}Mn_{0.098}$ | $Li_{1.005}Ni_{0.805}Co_{0.097}Mn_{0.098}$ |
| Example 21 | $Ni_{0.800}Co_{0.102}Mn_{0.098}$ | $Li_{1.004}Ni_{0.800}Co_{0.102}Mn_{0.098}$ |
| Example 22 | $Ni_{0.802}Co_{0.153}Al_{0.045}$ | $Li_{1.007}Ni_{0.802}Co_{0.153}Al_{0.045}$ |
| Example 23 | $Ni_{0.801}Co_{0.102}Mg_{0.097}$ | $Li_{1.008}Ni_{0.801}Co_{0.102}Mg_{0.097}$ |
| Example 24 | $Ni_{0.795}Co_{0.101}Mn_{0.104}Ti_{0.009}$ | $Li_{1.005}Ni_{0.795}Co_{0.101}Mn_{0.104}Ti_{0.009}$ |
| Example 25 | $Ni_{0.798}Co_{0.103}Mn_{0.099}Cr_{0.011}$ | $Li_{1.015}Ni_{0.798}Co_{0.103}Mn_{0.099}Cr_{0.011}$ |
| Example 26 | $Ni_{0.803}Co_{0.096}Mn_{0.101}Fe_{0.010}$ | $Li_{1.007}Ni_{0.803}Co_{0.096}Mn_{0.101}Fe_{0.010}$ |
| Example 27 | $Ni_{0.801}Co_{0.100}Mn_{0.099}Cu_{0.009}$ | $Li_{1.005}Ni_{0.801}Co_{0.100}Mn_{0.099}Cu_{0.009}$ |
| Example 28 | $Ni_{0.797}Co_{0.104}Mn_{0.099}Zn_{0.010}$ | $Li_{1.008}Ni_{0.797}Co_{0.104}Mn_{0.099}Zn_{0.010}$ |
| Comp. Example 1 | $Ni_{0.799}Co_{0.102}Mn_{0.099}$ | $Li_{1.010}Ni_{0.799}Co_{0.102}Mn_{0.099}$ |

TABLE 2

Intensity ratios of diffraction peaks obtained in Examples 1-28 and Comparative Example 1

| No. | I(001)/I(100) | I(001)/I(101) | I(101)/I(100) |
|---|---|---|---|
| Example 1 | 2.45 | 1.45 | 1.69 |
| Example 2 | 2.37 | 1.48 | 1.60 |
| Example 3 | 1.59 | 1.22 | 1.30 |
| Example 4 | 1.98 | 1.42 | 1.39 |
| Example 5 | 1.87 | 1.39 | 1.35 |
| Example 6 | 1.77 | 1.33 | 1.33 |
| Example 7 | 1.71 | 1.29 | 1.33 |
| Example 8 | 1.65 | 1.25 | 1.32 |
| Example 9 | 1.68 | 1.26 | 1.33 |
| Example 10 | 1.86 | 1.38 | 1.35 |
| Example 11 | 2.02 | 1.44 | 1.40 |
| Example 12 | 1.81 | 1.38 | 1.31 |
| Example 13 | 1.62 | 1.24 | 1.31 |

TABLE 2-continued

Intensity ratios of diffraction peaks obtained
in Examples 1-28 and Comparative Example 1

| No. | I(001)/I(100) | I(001)/I(101) | I(101)/I(100) |
|---|---|---|---|
| Example 14 | 2.41 | 1.51 | 1.60 |
| Example 15 | 2.45 | 1.45 | 1.69 |
| Example 16 | 2.45 | 1.45 | 1.69 |
| Example 17 | 2.45 | 1.45 | 1.69 |
| Example 18 | 2.43 | 1.51 | 1.61 |
| Example 19 | 2.42 | 1.58 | 1.53 |
| Example 20 | 2.43 | 1.55 | 1.57 |
| Example 21 | 2.43 | 1.54 | 1.58 |
| Example 22 | 2.44 | 1.53 | 1.59 |
| Example 23 | 2.44 | 1.55 | 1.57 |
| Example 24 | 2.32 | 1.49 | 1.56 |
| Example 25 | 2.29 | 1.47 | 1.56 |
| Example 26 | 2.26 | 1.47 | 1.54 |
| Example 27 | 2.09 | 1.45 | 1.44 |
| Example 28 | 2.13 | 1.46 | 1.46 |
| Comp. Example 1 | 1.19 | 1.04 | 1.14 |

TABLE 3

Experimental results for Examples
1-28 and Comparative Example 1

| No. | Discharge capacity, mAh/g | First-cycle efficiency, % | Capacity retention, % |
|---|---|---|---|
| Example 1 | 206.9 | 92.1 | 96.1 |
| Example 2 | 204.7 | 91.4 | 95.1 |
| Example 3 | 181.5 | 91.9 | 95.7 |
| Example 4 | 201.5 | 91.2 | 94.9 |
| Example 5 | 200.4 | 91.1 | 94.6 |
| Example 6 | 199.3 | 90.9 | 94.1 |
| Example 7 | 198.8 | 90.5 | 93.9 |
| Example 8 | 197.9 | 90.3 | 93.1 |
| Example 9 | 198.4 | 91.5 | 94.3 |
| Example 10 | 200.1 | 91.2 | 94.2 |
| Example 11 | 201.7 | 91.0 | 93.5 |
| Example 12 | 199.5 | 90.7 | 92.8 |
| Example 13 | 195.4 | 90.4 | 91.9 |
| Example 14 | 205.1 | 92.0 | 95.9 |
| Example 15 | 202.7 | 91.6 | 95.1 |
| Example 16 | 203.1 | 91.5 | 95.7 |
| Example 17 | 203.8 | 91.3 | 94.5 |
| Example 18 | 206.8 | 92 | 95.8 |
| Example 19 | 205.4 | 91.6 | 95.2 |
| Example 20 | 205.8 | 91.7 | 95.6 |
| Example 21 | 206.1 | 91.9 | 95.8 |
| Example 22 | 206.7 | 92 | 96.0 |
| Example 23 | 206.4 | 91.9 | 95.9 |
| Example 24 | 203.8 | 91.7 | 95.9 |
| Example 25 | 203.5 | 92 | 95.4 |
| Example 26 | 203.4 | 91.8 | 95.3 |
| Example 27 | 202.4 | 91.4 | 95.9 |
| Example 28 | 202.9 | 91.8 | 96 |
| Comp. Example 1 | 184.7 | 86.6 | 88.1 |

As can be seen from a comparison of the results shown in Table 3, as compared with the comparative example, the lithium battery positive active material precursor according to the present application is different from the precursor having a morphology of spherical polycrystal aggregate, comprises aggregates of platy monocrystals and polyhedral monocrystal particles, and has more exposed areas of the (001) crystal face and the (101) crystal face; meanwhile, the lithium battery positive active material according to the present application is different from the spherical polycrystal aggregate material and the dispersed monocrystal particle material, is a particle material in a form of secondary fusion body of monocrystals formed by primary monocrystal particles that are at least partially fused, has improved electrochemical properties, such as higher discharge capacity and first-cycle efficiency, and shows an improved cycle performance.

As can be seen from a comparison of the rate capability results shown in FIG. 7 and FIG. 11, as compared with the comparative example, the lithium battery positive active material precursor and the positive active material according to the present application show significantly improved rate capability, and exhibit significantly higher discharge capacity at a high rate, for example, at a rate of 10C, the discharge capacity of the positive active material prepared using the precursor material of the present application is about 2 times that of the positive active material obtained in the comparative example.

The present application has been described above in detail with reference to preferred embodiments thereof, but is not limited thereto. Various modifications can be made to the technical solutions disclosed in the present application without departing from the spirit of the present application, including various combinations of technical features made in any suitable manner other than those disclosed herein, and these modifications and combinations should also be considered as a part of the disclosure of the present application, and all fall within the scope of the present application.

What is claimed:

1. A lithium battery positive active material precursor, having a chemical formula of $Ni_xCo_yM_z(OH)_2$, wherein M is at least one metal selected from the group consisting of Fe, Cr, Cu, Ti, Mg, W, Mo, Nb, Zn, Sn, Zr, Ga, Mn and Al, $0.3 \leq x \leq 1$, $0 < y \leq 0.5$, $0 < z \leq 0.3$, and the values of x, y and z meet the electroneutrality rule,
wherein the precursor comprises aggregates of platy monocrystals and polyhedral monocrystal particles, and I(001), I(100) and I(101) of the XRD pattern of the precursor satisfy the following relationships:
I(001)/I(100) is not less than about 1.5, and
I(001)/I(101) is not less than about 1.2,
wherein I(001), I(100) and I(101) represent intensities, in terms of peak height, of the diffraction peaks corresponding to the (001), (100), and (101) crystal faces, respectively.

2. The precursor according to claim 1, wherein M is at least one metal selected from the group consisting of Mn, Al, and Mg, or is a combination of at least one metal selected from the group consisting of Mn, Al, and Mg with at least one metal selected from the group consisting of Fe, Cr, Cu, Ti, W, Mo, Nb, Zn, Sn, Zr, and Ga.

3. The precursor according to claim 1, wherein $0.6 \leq x \leq 0.95$, $0.025 \leq y \leq 0.2$, and $0.025 \leq z \leq 0.2$.

4. The precursor according to claim 1, wherein the I(001), I(100) and I(101) of the XRD pattern of the precursor satisfy the following relationships:
I(001)/I(100) is not less than about 1.8 and not greater than about 10;
I(001)/I(101) is not less than about 1.3 and not greater than about 5; and
I(101)/I(100) is not less than about 1.5 and not greater than about 5.

5. A method for preparing a lithium battery positive active material precursor according to claim 1, comprising the steps of:
(1) mixing a metal salt solution with a precipitant solution and a complexing agent solution for reaction, wherein the precipitant solution and the complexing agent solution are continuously fed into the reaction system, while the metal salt solution is intermittently fed into the reaction system; and (2) carrying out solid-liquid separation and drying treatment on the product obtained in step (1) to obtain the precursor;

wherein the metal in the metal salt solution comprises Ni, Co, and M, and M is at least one metal selected from the group consisting of Fe, Cr, Cu, Ti, Mg, W, Mo, Nb, Zn, Sn, Zr, Ga, Mn, and Al, a molar ratio among Ni, Co and M is about (0.3-1):(0-0.5):(0-0.3), with the proviso that an amount of Co and an amount of M are larger than 0.

6. The method according to claim 5, wherein M is at least one metal selected from the group consisting of of Mn, Al, and Mg, or is a combination of at least one metal selected from the group consisting of Mn, Al, and Mg with at least one metal selected from the group consisting of Fe, Cr, Cu, Ti, W, Mo, Nb, Zn, Sn, Zr, and Ga.

7. The method according to claim 5, wherein the precipitant is at least one selected from the group consisting of NaOH, KOH and LiOH; and the precipitant solution has a concentration of about 0.02-10 mol/L.

8. The method according to claim 5, wherein the complexing agent is at least one selected from the group consisting of ammonium ion donor, ethanolamines complexing agent, aminocarboxylic acids complexing agent, hydroxyaminocarboxylic acids complexing agent, and carboxylates complexing agent; and/or the complexing agent solution has a concentration of about 0.01-15 mol/L.

9. The method according to claim 5, wherein the reaction conditions of step (1) include: a temperature of about 30-70° C., a reaction time of not less than about 10 hours, a pH of about 9-14, and the metal salt solution is fed to the reaction system in at least two portions.

10. The method according to claim 5, wherein step (1) further comprises:

(1a) continuously feeding the metal salt solution, the precipitant solution, and the complexing agent solution into a reactor, allowing them to mix and react for about 2-12 hours;

(1b) suspending the feeding of the metal salt solution for about 0.5-4 hours; and (1c) repeating the steps (1a)-(1b) until the reaction is completed.

11. A lithium battery positive active material, having a chemical formula of $Li_aNi_xCo_yM_zO_2$, wherein M is at least one metal selected from the group consisting of Fe, Cr, Cu, Ti, Mg, W, Mo, Nb, Zn, Sn, Zr, Ga, Mn and Al, $0.9 \leq a \leq 1.2$, $0.3 \leq x \leq 1$, $0 < y \leq 0.5$, $0 < z \leq 0.3$, and the values of a, x, y and z meet the electroneutrality rule;

wherein the positive active material comprises particles in the form of secondary fusion body of monocrystals formed by primary monocrystal particles that are at least partially fused, and wherein the positive active material is obtained by a solid-phase reaction of a lithium battery positive active material precursor according to claim 1 with a lithium source.

12. The positive active material according to claim 11, having one or more of the following characteristics:

the primary monocrystal particles have an average size of about 0.2-3 μm;

the secondary fusion body of monocrystals has an average particle size of about 0.5-15 μm; and the positive active material has a layered crystal structure.

13. The positive active material according to claim 11, wherein M is at least one metal selected from the group consisting of Mn, Al, and Mg, or a combination of at least one metal selected from the group consisting of Mn, Al, and Mg with at least one metal selected from the group consisting of Fe, Cr, Cu, Ti, W, Mo, Nb, Zn, Sn, Zr, and Ga.

14. The positive active material according to claim 11, wherein $0.6 \leq x \leq 0.95$, $0.025 \leq y \leq 0.2$, $0.025 \leq z \leq 0.2$.

15. A lithium battery positive electrode, comprising a positive active material, a binder, and a conductive agent, wherein the positive active material is the lithium battery positive active material according to claim 11.

16. A lithium battery, comprising a positive electrode, a negative electrode, an electrolyte, and a separator, wherein the positive electrode is the lithium battery positive electrode according to claim 15.

17. The method according to claim 5, wherein the metal salt is at least one selected from the group consisting of sulfate, nitrate, acetate, chloride and oxalate; and the metal salt solution has a concentration of about 0.01-5 mol/L, calculated on the basis of metal elements.

18. The method according to claim 9, wherein said mixing of step (1) is carried out under stirring at a speed of about 50-1000 r/min.

19. The lithium battery positive electrode according to claim 15, wherein the lithium battery positive electrode comprises about 50-98 wt % of the positive active material, about 1-25 wt % of the binder, and about 1-25 wt % of the conductive agent.

20. The precursor according to claim 1, wherein M is at least one metal selected from Al and Mg, or is a combination of at least one metal selected from the group consisting of Al and Mg with at least one metal selected from the group consisting of Fe, Cr, Cu, Ti, W, Mo, Nb, Zn, Sn, Zr, and Ga.

* * * * *